(12) United States Patent
Martin

(10) Patent No.: US 12,718,159 B2
(45) Date of Patent: Aug. 25, 2026

(54) RAILROAD ENGINEERING ASSET MANAGEMENT SYSTEMS AND METHODS

(71) Applicant: BNSF Railway Company, Fort Worth, TX (US)

(72) Inventor: John David Martin, Arlington, TX (US)

(73) Assignee: BNSF Railway Company

( * ) Notice: Subject to any disclaimer, the term of this patent is extended or adjusted under 35 U.S.C. 154(b) by 1084 days.

(21) Appl. No.: 15/643,301

(22) Filed: Jul. 6, 2017

(65) Prior Publication Data

US 2019/0012627 A1 Jan. 10, 2019

(51) Int. Cl.

*G06Q 10/0631* (2023.01)
*B61L 25/00* (2006.01)
*B61L 27/53* (2022.01)
*G06F 16/11* (2019.01)
*G06Q 10/0635* (2023.01)
*G06Q 10/087* (2023.01)

(52) U.S. Cl.

CPC ..... *G06Q 10/06315* (2013.01); *G06F 16/113* (2019.01); *G06Q 10/0635* (2013.01); *G06Q 10/087* (2013.01); *B61L 25/00* (2013.01); *B61L 27/53* (2022.01)

(58) Field of Classification Search

CPC ............ G06Q 10/06315; G06Q 10/087; B61L 27/0088; B61L 25/00
USPC ......................................................... 705/7.25
See application file for complete search history.

(56) References Cited

U.S. PATENT DOCUMENTS 5,836,529 A * 11/1998 Gibbs ..................... B61L 27/14 701/19
6,434,452 B1 * 8/2002 Gray ..................... B61L 25/021 701/19
2001/0044681 A1 * 11/2001 Diana .................. B61L 25/023 701/19
2004/0140405 A1 * 7/2004 Meyer .................. B61L 25/028 246/122 R (Continued)

FOREIGN PATENT DOCUMENTS

CN 102128626 A * 7/2011
WO WO-2018175441 A1 * 9/2018 ........ B60W 30/0956

OTHER PUBLICATIONS

Siebert, Loren. “Using GIS to map rail network history.” The Journal of Transport History 25.1 (2004): 84-104. (Year: 2004).*

*Primary Examiner* — Kristin E Gavin
(74) *Attorney, Agent, or Firm* — Enrique Sanchez, Jr.; J. Miguel Hernandez; Whitaker Chalk Swindle & Schwartz PLLC

(57) ABSTRACT

A railroad asset inspection management system includes a plurality of remote terminals each having a user interface and a remote local database. A server includes a server database partitioned into a plurality of database partitions each associated with a territory of a railroad track system. When a remote terminal establishes a connection with the server, the server transmits changes in work orders stored in the server database partition corresponding to the territory in which the selected remote terminal is operating to the local database of the remote terminal and changes to inspection data stored in the local database of the remote terminal are transferred to the server database partition corresponding to the territory in which the selected remote terminal is operating.

14 Claims, 14 Drawing Sheets

(56) References Cited

U.S. PATENT DOCUMENTS

| | | | | |
|---|---|---|---|---|
| 2005/0096991 | A1* | 5/2005 | Main, II | G06Q 10/06 705/22 |
| 2006/0058957 | A1* | 3/2006 | Hickenlooper | B61L 25/026 701/408 |
| 2008/0208397 | A1* | 8/2008 | Miklos | G06Q 10/087 701/3 |
| 2009/0177401 | A1* | 7/2009 | Otsubo | G09B 29/007 702/5 |
| 2010/0131129 | A1* | 5/2010 | Daum | G07C 5/008 701/19 |
| 2010/0237857 | A1* | 9/2010 | Holfeld | B61K 9/10 324/217 |
| 2011/0285842 | A1* | 11/2011 | Davenport | B61L 27/40 348/116 |
| 2013/0300551 | A1* | 11/2013 | Weber | B61L 25/025 340/435 |
| 2014/0200829 | A1* | 7/2014 | Hampapur | G06Q 10/06 702/34 |
| 2014/0278708 | A1* | 9/2014 | Byk | G06Q 10/06315 705/7.25 |
| 2015/0291193 | A1* | 10/2015 | Perras | B61L 25/025 246/122 R |
| 2016/0176423 | A1* | 6/2016 | Rude | B61L 25/028 246/123 |
| 2016/0221592 | A1* | 8/2016 | Puttagunta | B61L 25/025 |
| 2017/0066459 | A1* | 3/2017 | Singh | B61L 25/021 |

* cited by examiner

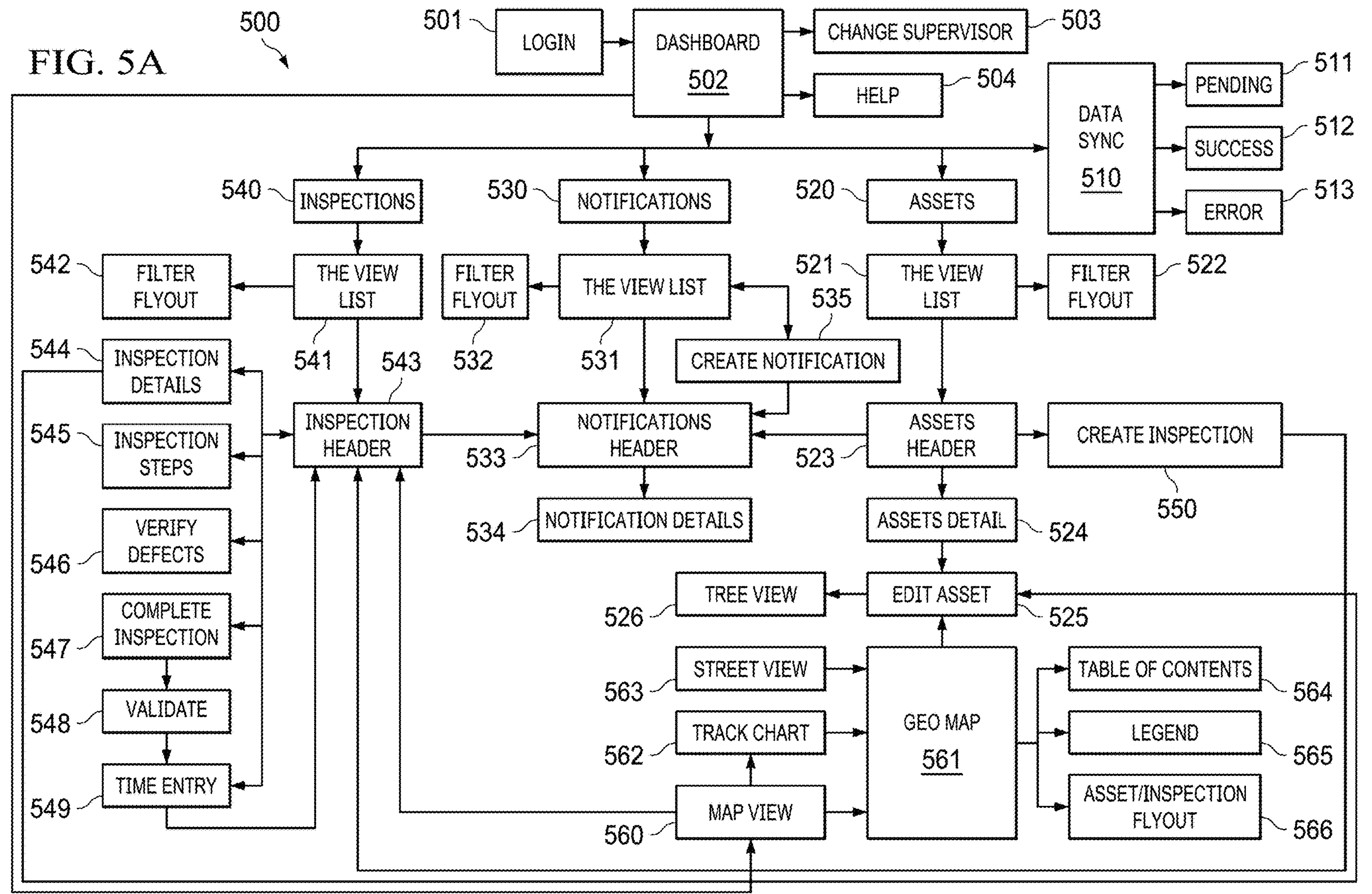
FIG. 5A
500
LOGIN
501
DASHBOARD
502
CHANGE SUPERVISOR
503
HELP
504
DATA SYNC
510
PENDING
511
SUCCESS
512
ERROR
513
ASSETS
520
THE VIEW LIST
521
FILTER FLYOUT
522
ASSETS HEADER
523
ASSETS DETAIL
524
EDIT ASSET
525
TREE VIEW
526
NOTIFICATIONS
530
THE VIEW LIST
531
FILTER FLYOUT
532
NOTIFICATIONS HEADER
533
NOTIFICATION DETAILS
534
CREATE NOTIFICATION
535
INSPECTIONS
540
THE VIEW LIST
541
FILTER FLYOUT
542
INSPECTION HEADER
543
INSPECTION DETAILS
544
INSPECTION STEPS
545
VERIFY DEFECTS
546
COMPLETE INSPECTION
547
VALIDATE
548
TIME ENTRY
549
CREATE INSPECTION
550
MAP VIEW
560
GEO MAP
561
TRACK CHART
562
STREET VIEW
563
TABLE OF CONTENTS
564
LEGEND
565
ASSET/INSPECTION FLYOUT
566

RAILROAD ENGINEERING ASSET MANAGEMENT SYSTEMS AND METHODS

FIELD OF INVENTION

The present invention relates in general to railroad operations, and in particular to railroad engineering asset management systems and methods.

BACKGROUND OF INVENTION

Inspection maintenance, and repair of assets, including tunnels, signals, bridges, track, and so on, are critical to safe railway operations. However, for a Class 1 railroad having thousands of miles of track and numerous fixed and moving assets spread over a very large geographical area, collecting and managing asset data is a difficult task. For example, the BNSF Railway Co. has approximately 40,000 miles of track, extending across 28 U.S. states and three Canadian provinces, along with thousands of bridges, tunnels, and culverts. In addition, BNSF has similarly large numbers of other fixed assets, including waysides, crossing gates and lights, signals, and hazard detectors, as well as thousands of movable assets, such as locomotives, rail vehicles, and railcars.

Existing information management technologies are subject to a number of significant limitations, which makes them unsuitable for collecting, storing, and distributing railroad asset information generated by multiple teams operating at widely disparate geographical locations. Among other things, the existing technologies do not accurately correlate actual assets, inspection maintenance and repair data, and defects with the corresponding computer-generated geographic location information. In addition to the lack of precise geographical information, currently available information management systems do not provide a personnel in the field with other critical information necessary for proper inspection maintenance, and repair of particular assets, such as information about their physical aspects, pending and historical inspections and repair, and previously recorded defects.

SUMMARY OF INVENTION

One embodiment of the principles of the present invention is a railroad asset inspection management system, which includes a plurality of remote terminals each having a user interface and a remote local database. A server includes a server database partitioned into a plurality of database partitions each associated with a territory of a railroad track system. When a remote terminal establishes a connection with the server, the server transmits changes in work orders, assets, defects (notifications), and the associated metadata for these objects, are stored in the server database partition corresponding to the territory in which the selected remote terminal is operating to the local database of the remote terminal. Substantially concurrently, changes to inspection data stored in the local database of the remote terminal are transferred to the server database.

According to another embodiment of the present principles, a railroad asset inspection management system is disclosed, which includes a plurality of remote terminals each including a user interface for presenting received inspection work orders and inputting railroad asset inspection information. Each remote terminal also includes a local database for storing the received inspection work orders, assets, defects (notifications), the associated metadata for these objects, and the input railroad asset inspection information. Each remote terminal is also able to measure a global positioning system (GPS) position and display the terminal's current location relative to at least one railroad asset, A server communicating with the remote terminal identifies a mapped feature within a predetermined distance of the measured GPS position and finds coordinates of a point on the mapped feature nearest to the measured GPS position. The server may then determine a milepost for the coordinates of the point on the mapped feature nearest to the measured GPS position and associates that GPS position with attributes of the mapped feature. The remote terminal may then present the remote terminal position on a visual representation on the user interface at the point on the mapped feature nearest to the measured GPS position, along with the attributes of the mapped feature and the milepost. The system also includes a server having a server database for storing railroad asset inspection information and inspection work orders of a railroad network and the server operable to synchronize the local database of a selected remote terminal with the server database when the selected remote terminal establishes a connection with the server.

The principles of the present invention advantageously allow railroad personnel working in the field to access current and accurate information regarding the location and state of various railroad assets, even though those assets may be large in number and distributed across a wide geographical area. In the representative case of asset inspections, a networked system provides inspectors with a graphical user interface through a set of remote terminals, each of which presents critical information such as location, required inspection steps, and the state and history of the asset being inspected. Each remote terminal also allows and inspector to create complete and accurate electronic records of each inspection as it progresses. Advantageously, the present principles assist in managing compliance with Federal Railroad Administration (FRA) inspection requirements by alerting railroad employees to assets requiring inspection.

In particular embodiments, each remote terminal combines inspection information with Geographic Information System (GIS) maps, which present precise location information to the inspector relative to the railroad track network in both online and offline modes. Linear Referencing allows specific assets to be precisely mapped on top of the track network map using Global Positioning System (GPS) data and identified by line segment and milepost. The system also records the time required to complete the inspection, which provides valuable information when calculating the total cost of ownership of an asset.

BRIEF DESCRIPTION OF THE DRAWINGS

For a more complete understanding of the present invention, and the advantages thereof, reference is now made to the following descriptions taken in conjunction with the accompanying drawings, in which:

FIG. 5A is a flow chart illustrating a representative process for navigating through a preferred graphical user interface presented on a given one of the remote terminals of FIGS. 1-3;

FIGS. 6C-1 and 6C-2 are a flow chart illustrating a preferred procedure for calculating the measure value for the nearest point on the railroad line segment to the GPS location point.

DETAILED DESCRIPTION OF THE INVENTION

The principles of the present invention and their advantages are best understood by referring to the illustrated embodiment depicted in FIGS. 1-6 of the drawings, in which like numbers designate like parts.

Figure 1:
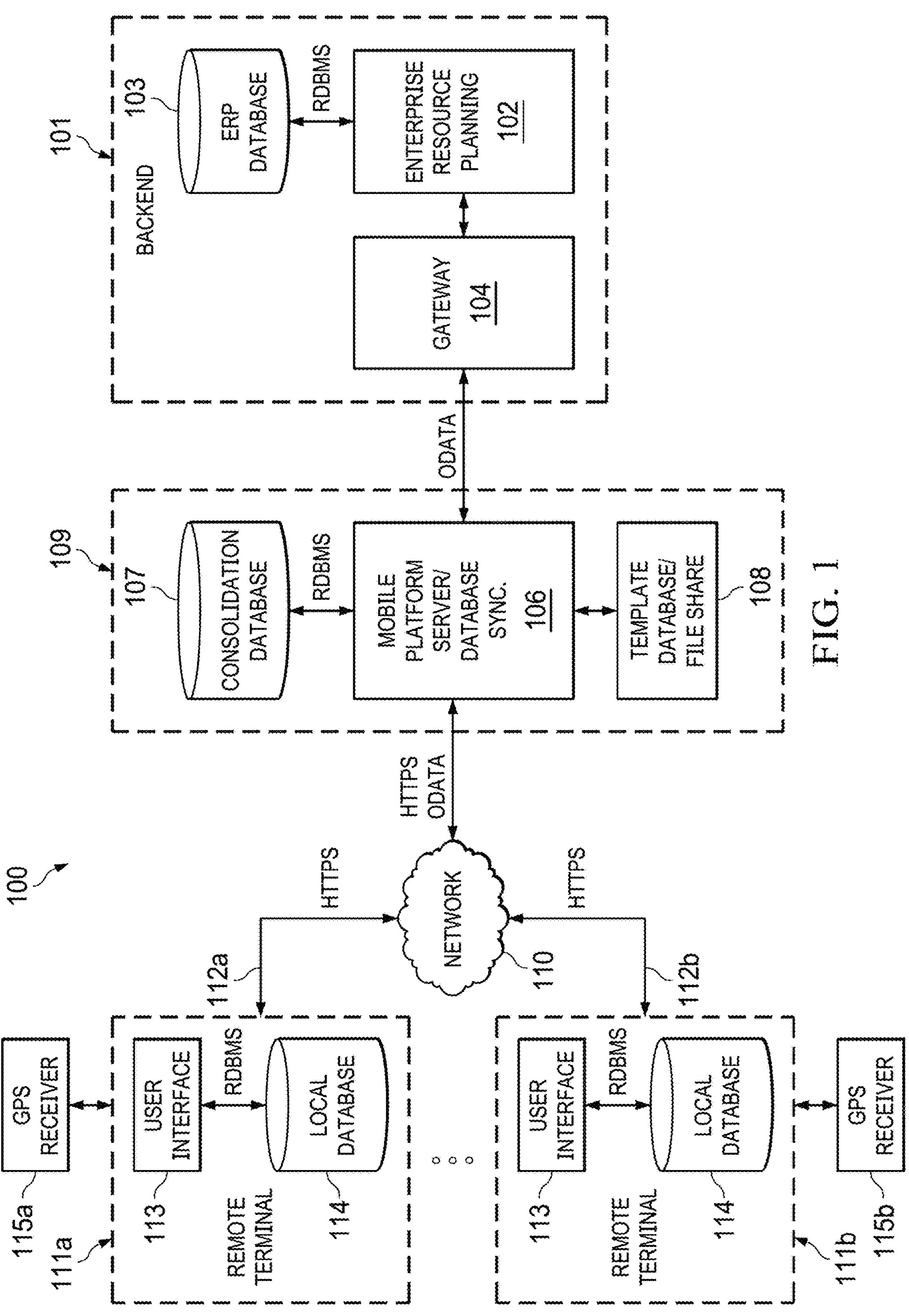
FIG. 1 is a high level system block diagram of an engineering asset management (EAM) system embodying the principles of the present invention.

FIG. 1 is a diagram of an exemplary engineering asset management (EAM) system 100 embodying the principles of the present invention. EAM system 100 includes a Backend System 101, which may be based, for example, on one or more servers, a network of servers, one or more mainframe computers, a network of personal computers, or any combination of these hardware platforms. Backend hardware system supports an Enterprise Resource Planning (ERP) software system 102, along with associated ERP database 103 and a gateway 104 and associated local database 105. In the illustrated embodiment, ERP database 103, which is a Microsoft SQL 2010, SAP HANA, or equivalent database, is managed by a relational database management system (RDBMS).

Gateway 104 communicates with a Mobile Platform Server 109, preferably using the Open Data Protocol (ODATA). In the illustrated embodiment of EAM system 100, Mobile Platform Server 109 supports a mobile platform server/database synchronization software system 106, operating in conjunction with a local database 107. Consolidated database 107 preferably runs in conjunction with a RDBMS. Mobile Platform Server 109 also operates in conjunction with a template database/file share system 108, which could include multiple databases.

A Network 110, which may be a public network, such as the Internet, or a private communications network, supports communications between Mobile Platform Server 109 and a set of remote terminals, two of which are shown as Remote Terminal 111*a* and 111*b* for reference. In the preferred embodiment, communications between Mobile Platform Server 109 and Remote Terminals 111 is REST-based (HTTPS).

A given Remote Terminal 111, may be based on, for example, a tablet computer (e.g., an Apple iPad, Microsoft Surface), smart phone (e.g., an Apple iPhone, Android), laptop or desktop personal computer, or other device or system capable of supporting applications software and wireless or wired network communications. Remote Terminals 111 connect to Network 110 through corresponding set of communications links 112, which may be, in whole or in part, conventional hardwired communications links such as DSL, or conventional wireless communications links such as WiFi links, wireless wide area network (WAN) links, or cellular telephone links.

Figure 2:
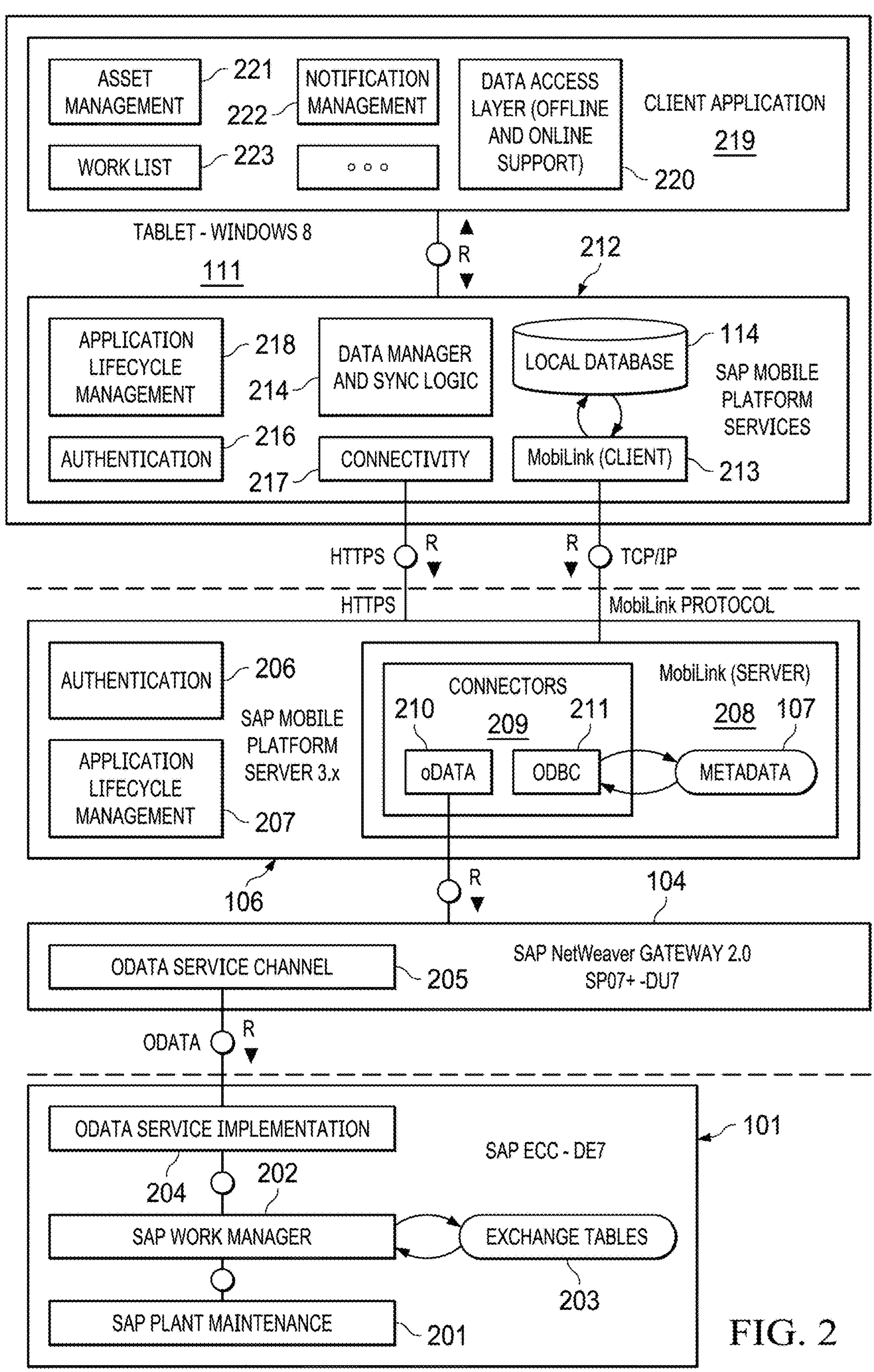
FIG. 2 is more detailed system level block diagram showing the primary hardware resources and data processing modules of a particular embodiment of the EAM system of FIG. 1.

FIG. 2 is a more detailed block diagram of a particular architecture suitable for implementing EAM system 100 of FIG. 1. In the embodiment of FIG. 2, ERP system 102 is an SAP Enterprise Central Component (ECC) system, which includes an OData Service Implementation Module 204, SAP Work Manager 202 and associated Exchange Tables 203, and SAP Plant Maintenance Module 201.

Generally, Plant Maintenance Module 201 performs mobile and linear asset management tasks, generates reports, records reported problems, and plans for operations such as inspections (i.e., establishing the condition of the technical system), preventative maintenance, and repair.

Plant Manager 202 maintains work order details, generates work orders, sets work order status, tracks asset locations, maintains inspection and repair histories, creates notifications, and assigns tasks and activities. Exchange tables 203 are used to compare data on remote terminals 111 with those on Backend System 101 such that only differences in data need be synchronized, as discussed further below. Work Manager 202 manages changes in the objects managed by Plant Manager 202 and provides efficiency via the exchange tables to identify data that has changed and requires synchronization.

In the preferred embodiment of EAM 100, data are exchanged between Backend System 101 and Remote Terminals 111 using the Open Data Protocol (OData), which supports REST (Representational State Transfer) architectures such as HTTP and HTTPS. Generally, OData services use basic HTTP requests (e.g., Get, Patch, Post, Delete) from clients to resources identified by URI (Uniform Resource Identifier). Under the OData protocol, the payload of requests and responses are represented in the Atom Publishing Protocol (AtomPub) format, Extended Mark-up Language (XML) format, or the JavaScript Object Notation (JSON) format.

An Entity Data Model (EDM) is the abstract data model that provides the vocabulary for characterizing exposed data. OData resources are generally network-accessible data objects or services, which map to the EDM, such relational database structures, (e.g., tables and table rows and columns), and function imports.

Under the OData protocol, the basic structure of the EDM is the Entity, which has an Entity Type defined by a set of Properties. Entities are grouped by Entity Type into Entity Sets and Entity Sets grouped into Entity Containers. In the example of a table-based relational database, an Entity Container may map to an entire database, an Entity Set to a specific table, an Entity to a row in the table, and a Property to a column in the table.

The entity type data structure includes the Entity Type Name (Entity Type), a Key, Properties, and Navigation Properties. The key is defined by at least one of the properties. Each Property is defined by name, its primitive data type, and certain characteristics, such as whether or not the property is nullable. Associations are used to define the relationship between Entity Types and Navigation Properties are used to define navigation paths between association endpoints.

The EDM structures then map to the serialization method (e.g., XML, AtomPub or JSON). For example, in the case of an AtomPub resource, the Entity Container may map to an AtomPub Service, an Entity Set to a Collection or Feed, an Entity to an Entry, and a EDM Property to an AtomPub Property.

In other words, with regards to the serialization method, feeds are constructed from Collections of typed Entries, which are structured records, represented by an XML, AtomPub or JSON Document. Links relate Entries and other entries and feeds. Media link entries contain structured data describing a Media Resource, which is typically a BLOB (Binary Large Object). Service operations are typically specific functions that receive input parameters and return entries or complex/primitive values.

Exposed metadata documents based on the EDM allow for the generation of HTTPS requests to access specific resources. In particular, a Service Document allows a client to discover top-level feeds, especially when a service provides multiple feeds, as well as to identify the feed addresses. A service metadata document, which is written in the Conceptual Schema Definition Language (CSDL), describes the EDM for the resources exposed at an HTTP endpoint.

The OData Protocol defines a particular set of URI structures for implementing client-server exchanges. The general structure is HTTP or HTTPS with a service root URL, a resource path, and a query option. The service root URL includes the identifier of the host and the service (e.g., http://host/service). The resource path may include, for example, the name of an entity set, an entity identified by key, the name of a function that will return an entity set or single entity, or the name of a singleton (i.e., a single entity within an entity container), among others. The OData Protocol also defines a number of query options that may be appended to a URI, including filtering, ordering, logical operations, and arithmetic operations.

The service document is returned in response to a GET request from the client to the root service URL (e.g., GET http://host/service) and identifies each of the resources available from the OData service in a single workspace element. The URI identifying each entity set is used as an attribute associated with that entity set and allows for the client to generate requests. The CSDL service metadata document is provided to a client in response to a GET http://host/service/$metadata, and characterizes EDM elements.

In some instances, there are alternate ways to access resources. For example, an entity set may be requested by appending the entity set name to the service root URL, generally in the form http://host/service/entityset. An entity set can also be requested with a collection-valued navigation property appended to the service root URL, such as http://host/service/entitycolnavigationproperty or with a function that returns a collection of entities: http://host/service/entitycolfunctioncall.

A single entity can be requested by appending the entity set name and a key predicate, which represents the key property or key properties of the entity, to the service root URL, such as http://host/service/entityset("predicatekey"). Properties can in turn be identified within the entity by further appending the name of the entity property, such as http://host/service/entityset("predicatekey")/entitycomplexproperty, for a complex property, or http://host/service/entityset("predicatekey")/entityproperty, for a simple property.

Navigation properties are used to navigate from an entity type to a second entity type, as associated by a defined Association. For example, http://host/service/entityset("predicatekey")/navigationproperty navigates from the entity identified by the entity set name and the predicate key to an associated entity of another entity type identified by the navigation property.

In addition, by appending defined combinations of expressions to the service root URL, function imports may be called, which return instances of complex types, instances of primitive values, as wells as collections of complex types and primitive values.

The OData specification also defines a set of queries that can be appended to the URL to particularize search results. Among the available options are filtering, ordering, free-text searching, formatting, and counting. The filtering query option is associated with a set of filtering expressions, which allow for the identification of a subset of entries with in a collection by applying logical operators, arithmetic operators, and string functions to properties and literal values within entities. For example, http://host/service/entityset("predicatekey")$filter=propertyconstraint identifies entries having a property value matching a given constraint.

In the preferred embodiment of EAM system 100, OData Service Implementation module 204 is developed on Backend System 101, which realizes a number of distinct advantages, including the ability to isolate backend processes from those of Gateway 104 and the ability to locally access data from consolidated database 107. Given the flexibility of the OData Protocol, other platforms and architectures may be used to implement the OData Service. For example, the OData Service can alternatively be entirely developed on Gateway 104 itself.

In the preferred embodiment of EAM system 100, OData Service Implementation module 204 implements a Model Data Provider Class (MDC) and a Runtime Data Provider Class (RDPC) using the Advanced Business Application Programming (ABAP) programming language.

The MDC generates runtime objects producing the metadata for entities, entity sets, associations between entities, navigation properties, actions, and function imports in accordance with the EDM. The properties for each entity type may be defined by the dictionary structure of an underlying database table, by importation using an RFC to the underlying business processes, or by import of an element from a Business Object Repository (BOR).

The RDPC includes a set of methods for operating on the business data (e.g., Get_Entity, Get_EntitySet, Create_Entity, Delete_Entity, Update_Entity, and Execute Action, among others). For a typical Create_Entity method, the input parameters include the entity type name, the entity type at the beginning of any navigation path, the data provider interface deserializing the payload into underlying application data structure, methods (e.g., data ordering, filtering, service path), the full navigation path, and information for generating HTTP response headers. For a typical Get_EntitySet method, the input parameters include the entity type, the entity type at the beginning of any navigation path, filtering strings, paging parameters, ordering parameters, search strings, the key tab, the full navigation, the output structure showing the output entities, and information for generating HTTP response headers. For example, the Get_EntitySet may return a reference to an underlying data resource (e.g., a table within consolidated database 107 holding the requested data).

The OData service implemented by OData Service Implementation module 204 also supports delta handling such that only data that has changed since the last synchronization between the remote terminals and consolidated database 107 are passed to remote terminals 111. For delta handling, Backend System 101 passes a delta token, such as a timestamp, to remote terminals 111. In the preferred embodiment, the delta token is inserted at the end of an OData feed as a delta link and passed to a target remote terminal 111. When the target remote 111 only requires the changed data, it requests those data via the delta link, which initiates a delta request with a Get_Entity_Set method within the RDPC. Delta handling may be used when entities within an entity set have been updated, deleted, or added.

The OData service is registered on Gateway 104, which in the illustrated embodiment of EAM system 100 is a SAP Netweaver gateway. In EAM System 100, Gateway 104 operates as a hub interfacing with MobiLink Server 208. Among other things, Gateway 104 provides the service base URL, registers Remote Terminals 111 with inbound and outbound queues, handles load balancing, and generates the service document. Gateway 104 also checks that a requesting Remote Terminal 111 is registered and has the credentials to engage in a requested transaction.

Gateway 104 includes OData Service Channel 205, which handles OData exchanges between Backend System 101 and Mobile Platform Server 109. OData Service Channel 205 exposes the OData Service and formats the data for transmission. In the case of an AtomPub feed, OData Service Channel 205 generates the ID (the URI to which the data is to be posted), and presents the collection of entries (i.e., feed), with each entry including an ID, title, time and date of updating, and contents, such as an XML document or a link to an XML document. A typical XML document includes a payload set of properties mapping to one or more of the EDM property types.

In the preferred embodiment of EAM System 100, SAP MobiLink server 208 consumes the OData. Generally, when Mobile Platform Server 109 receives an URI from a Remote Terminal 111 via the network layer (e.g., HTTPS), it decodes the URI and passes a RFC to OData Service Channel 205. In turn, OData Service Channel 205 calls the corresponding method in the RDPC of OData Service Implementation module 204, which implements the requested access from Backend System 101. In the preferred embodiment, OData Service Implementation module 204 and OData Service Channel 205 exchange data as XML OData feed documents.

When a Remote Terminal 111 transmits an HTTP GET method to the service root URL with the entity set name appended, MobiLink Server 208 issues an RFC to OData Service Channel 205, which issues a RFC to Backend System 101. The RDPC invokes the Get_EntitySet method and Backend System 101 and OData Service Channel 205 return the requested data to MobiLink Server 208, for example, as an Atom Pub feed. Similarly, when a Remote Terminal sends an HTTP GET request to the service root URL with the entity set name and a key predicate in the query string, the Get Entity method is invoked by the RDPC and single entry (e.g., an Atom Pub entry) is returned to MobiLink Server 208 by Backend System 101 through OData Service Channel 205.

Likewise, a Remote Terminal 111 can request an OData Update operation by sending MobiLink Server 208 a HTTP PUT request to the service base URL with the entity set name and a key predicate in the query string, along with an XML payload. MobiLink Server 208 sends an RFC to OData Service Channel 205, which invokes the Update Entity method to update a single entity, for example, an entry in consolidated Database 107. When an authorized remote terminal sends a HTTP POST method to the service base URL and the entity set name, along with an XML payload, a similar process invokes the Create_Entity method by the RDPC.

A Remote Terminal 111, when authorized, can send an HTTP Delete request to the service base URL, the entity set name, and key predicate, which invokes the Delete_Entity method (i.e., an OData Delete operation) by the RDPC. Finally, an operation can be invoked by a Remote Terminal 111 with a GET/POST HTTP method to the service base URL plus the operation name and a parameter list in the query string, which initiates the Execute_Action method of the RDPC.

In the preferred embodiment of EAM system 100, Mobile Platform Server 109 is an MS Windows Server configured using an IBM DB2 database. Authentication module 206 controls the authentication of Remote Terminals 111, with delegation to Gateway 104.

OData is processed with an SAP MobiLink server 208, through a set of connectors 209, including OData Connector 210 and Open Database Connectivity (ODBC) Connector 211. OBDC 211 accesses Metadata 215 within consolidated database 107, which stores the OData metadata supporting the REST transactions, as discussed above.

MobiLink server 208 supports the synchronization of data within consolidated database 107 (FIG. 1) with the data within the local databases 114 of remote terminals 111, as discussed further below.

In the preferred embodiment of EAM system 100, each remote terminal 111 is a tablet computing system running on a Windows 8 operating system. The front end is based on a SAP Mobile Platform Services subsystem 212, which includes a MobiLink Client 213 supporting communications between MobiLink Server 208 and Local Database 114. HTTPS REST services are established through Connectivity Module 217. SAP Mobile Platform Services subsystem 212 also includes Data Manager and Sync Logic 214, Authentication Module 216, and Application Lifecycle Management Module 218. In the preferred embodiment, Local Database 114 is an SAP SQL Anywhere database.

Client Application 219 is the backend of each Remote Terminal 111 and includes Data Access Layer 220, Notification Management Module 222, Asset Management Module 221, and Work List Module 223.

In the MobiLink system, synchronization is typically triggered when a Remote Terminal 111 establishes a network connection with MobiLink Server 208, although MobiLink Server 208 can also notify an online Remote Terminal 111 to initiate synchronization. In the preferred embodiment, in which Local Database 114 is an SAP SQL Anywhere database, the upload stream is built before the network connection is established. (Generally, to establish a connection, a Remote Terminal 111 requests a network connection and MobiLink Server 208 uses a network stage thread to accept the connection or refuse it if the connection limit is reached.)

Once a network connection is established, the network stage thread of MobiLink Server 208 reads the upload stream from Remote Terminals 111 Network 110 into cache. A stream-stage thread decodes the uploaded data into MobiLink protocol commands. The stream-stage thread also performs any required decryption and/or decompression.

A command processor stage of MobiLink Server 208 processes the queue of MobiLink protocol commands using a set of command processor threads. A list is created for those commands requiring access to Backend System 101 and a command processor thread is assigned to the synchronization. MobiLink Server 208 maintains a pool of connections to Backend System 101 through Gateway 104. Once access is required, the command processor thread accesses a connection and processes the upload commands using upload scripts until the task is completed. For example, the upload script may upload data from Local Database 114 of the Remote Terminal 111 to rows in consolidated database 107.

After the list of upload database commands has been completed, the command processor thread begins executing download database commands to transfer data from Backend System 101 to Local Data Base 114 of the Remote Terminal 111 using download scripts. For example, the download script may access rows within Consolidated Database 107 and cache the fetched rows with MobiLink Server 208. The command processor thread can then release the connection back to the pool.

The command processor threads pack the downloaded data into the download stream format and transfer the download stream to the Local Database 114 of a Remote Terminal 111 through MobiLink Client 213. MobiLink Client 213 processes the download stream by, for example, deleting rows, inserting new rows, updating rows, or updating indices within Local Database 114.

Delta handling is implemented using a delta token, which was passed back from Gateway 104 to MobiLink Server 208 as a link during the previous synchronization. When MobiLink Server 208 receives an HTTP URI request from a remote terminal 111, it calls OData Service Channel 205 with the delta token. In turn, OData Service Channel 205 calls the Get_Entity_Set_Delta method of the RDPC. Exchange tables 203 are used to track the changes to the requested Entity Set. The updated data are passed back to OData Service Channel 205 and MobiLink Server 208, for example as an OData Atom Pub XML payload. MobiLink Server 208 then passes the data to MobiLink Client 213 as a download data stream.

Backend System 101 can also send notifications (push or pull) to remote users through OData Service Channel 205 on an Entity Type basis. Gateway 104 is established as a background RFC destination from Backend System 101. The EDM definitions are used to identify each Entity Type for subscription and notification enablement. RDPC methods are defined for notification operations in response to Create Entity, Delete Entity, and Update Entity operations being performed on the given entity type.

Backend System 101 tracks changes to the identified entities and sends a notification to Gateway 104, which forwards the notification to MobiLink Server 208 as an OData AtomPub or JSON document. MobiLink Server 208 forwards the notifications to the appropriate remote terminals 111 in XML or JSON.

Figure 3:
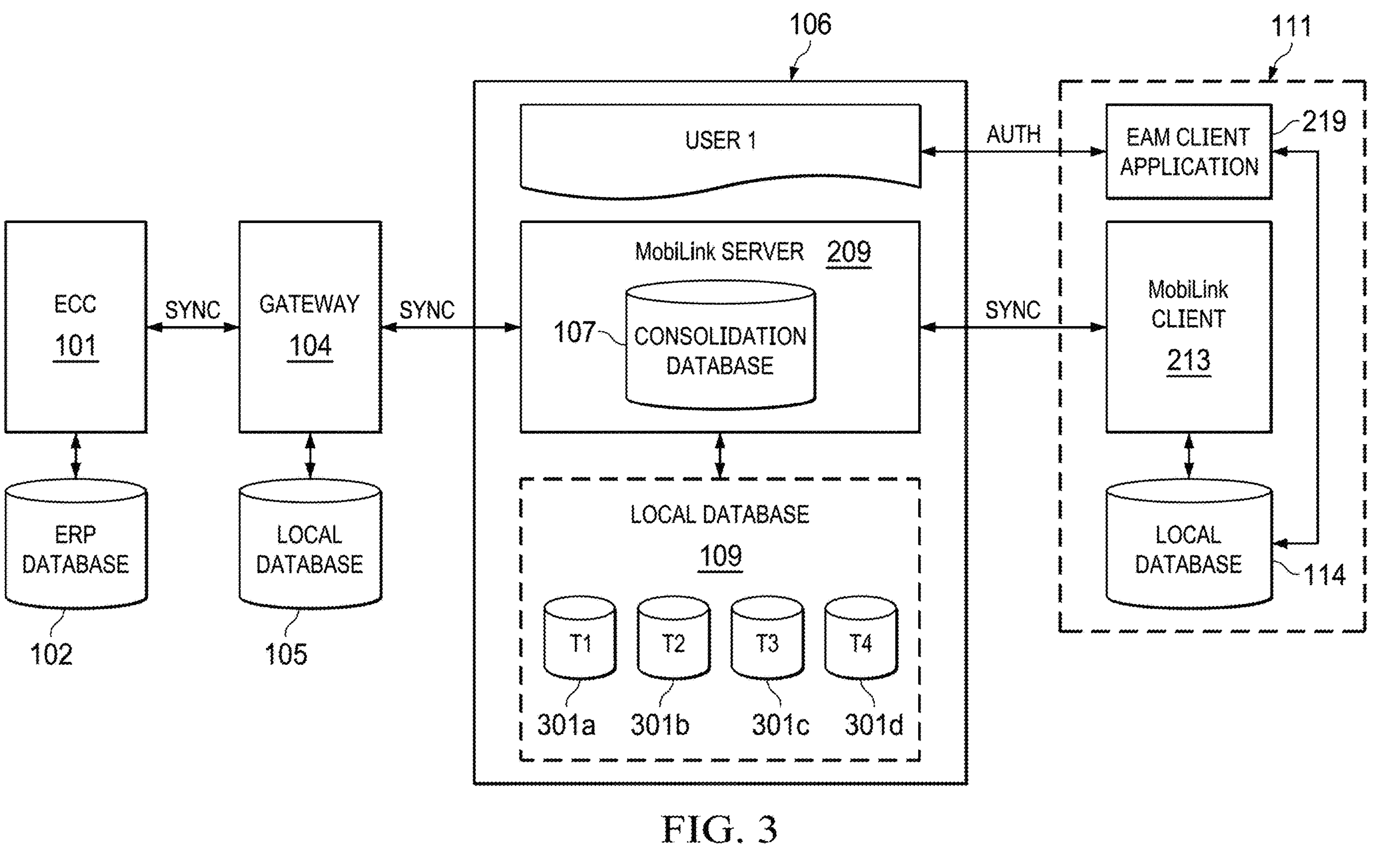
FIG. 3 is a high level block diagram illustrating the synchronization of databases within the EAM system of FIG. 2.
Figure 4:
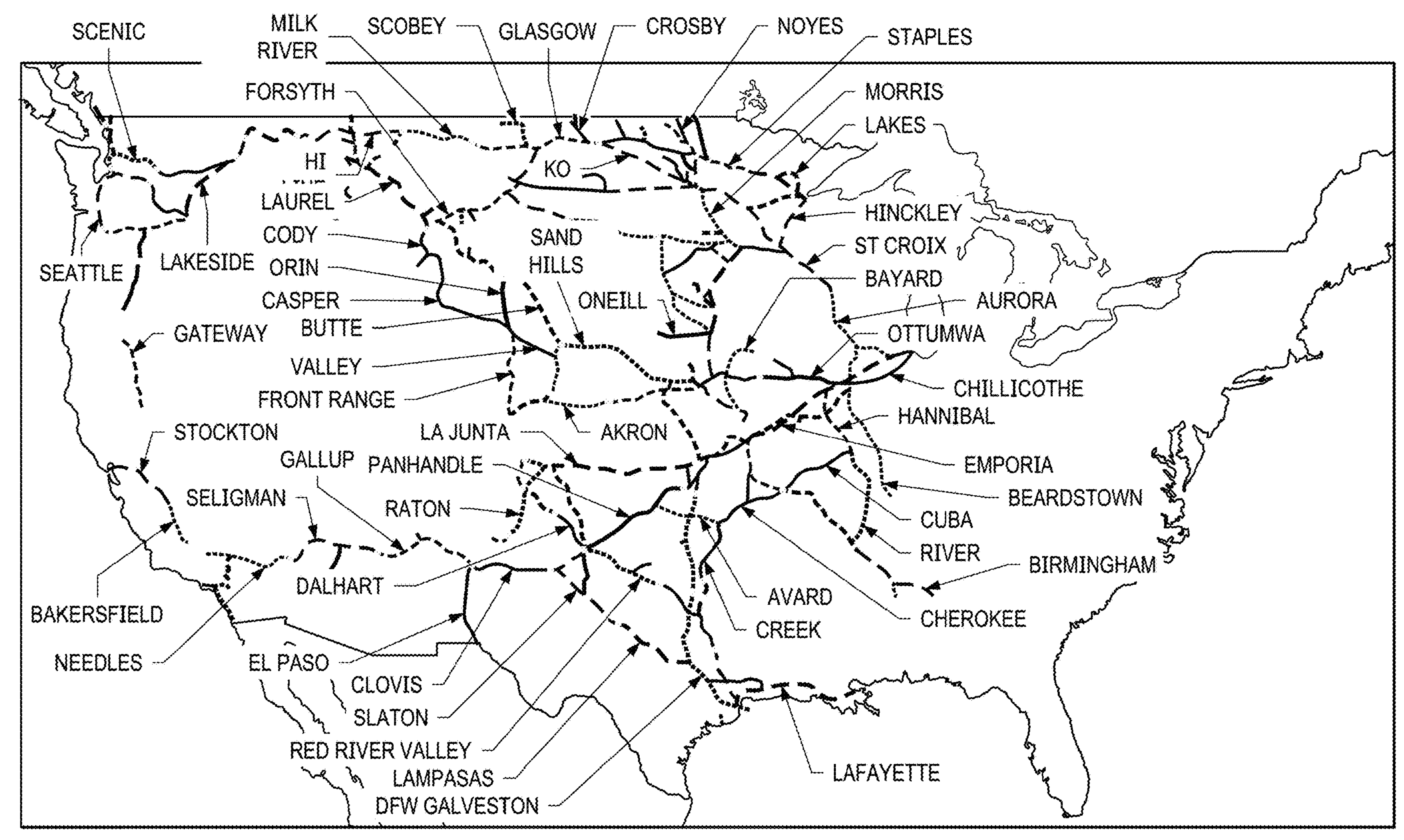
FIG. 4 is diagram showing the segmentation of a representative railroad network into territories suitable for describing the exchange of railroad network data between central office backend systems and the remote terminals of FIGS. 1-3 based on geographical region.

FIG. 3 shows a particular embodiment of EAM System 100, which is described in detail below in conjunction with FIG. 4. FIG. 4 is a diagram showing, the BNSF Railway Company rail network, which is representative of rail networks to which EAM System 100 may suitably be applied. The exemplary rail network shown in FIG. 4 generally gives an indication of geographical area over which assets must be maintained, inspected, and repaired.

Railroad system assets can generally categorized as track, signals, structures, and roadway equipment. Accurate and timely information exchange between the home office and personnel in the field is critical for maintaining, repairing, and inspecting these assets, notwithstanding the fact that these assets number in the thousands and are distributed over a rail network extending over thousands of miles of track.

Track assets include, among other things, main track, sidings, back tracks, industry tracks, curves, derails, rail crossings, control points, left rail and right rail, road crossings, turnouts, yards, insulated joints, bumping posts, gauge rods, right of way fences, signs, and non-turnout guard rails.

Representative signal assets include crossing warning devices, wayside signals, hazard and train defect detectors, polelines, auto train stops, enclosures, and signal turnout components (e.g., switches, snow melting equipment).

The structures category include, among other things, tunnels, arches, bridges, culverts, dams, cross walls, pits, ramps, docks, scales, snow sheds, turn tables, and wind fences. Exemplary roadway equipment includes road-rail vehicles and ballast maintenance equipment.

In addition, precise and current information must be maintained on linear characteristics including speeds, types of operations, supervisor boundaries, primary routes, subdivision and key routes, FRA Class, tonnage, inspector territories, rail, and ties.

In the example of the BNSF rail network shown in FIG. 4, both the number of assets that must be managed and the geographical area over which they are distributed are substantial. Geographically, the BNSF rail network extends over across 28 U.S. states and three Canadian provinces. The network itself includes approximately forty thousand (40,000) miles of track, sixty seven thousand (67,000) bridges and culverts, twenty six thousand (26,000) road crossings, forty four thousand (44,000) switches and signals, and three hundred (300) yard facilities. In addition to the fixed assets such as track and structures, the number of non-fixed assets is also substantial and includes approximately six thousand (6,000) locomotives, seventeen thousand (17,000) pieces of track repair equipment, and forty thousand (40,000) freight cars (although on average 220,000 freight cars, from various railroads, may be using the network at one time).

In order to manage such a substantial number of widely distributed assets, EAM System 100 must process on the order of fifteen million (Ser. No. 15/000,000) electronic records. Furthermore, the exchange of data between a railroad home office and inspectors, maintenance teams, and other personnel in the field is challenging, given the wide distribution of personnel and assets. For example, the home office must send inspection orders to inspectors in the field and those inspectors must record and return inspection results to the home office. The assets requiring inspections must be precisely identified.

EAM System 100 advantageously combines the recording of data taken during operations in the field with geospatial location information. For purposes of discussion, inspection of assets will be used as an example, although EAM System 100 can equally be used for managing other field operations, such as maintenance and repair.

EAM System 100 supports a Signal Inspections System, Track Inspection Systems, Structures Inspection System, a Roadway Inspections System, and the inspection of critical shop equipment. The Signals Inspections System allows inspectors to inspect signal assets, log of hours of service, and manage documents. Among others, for signal, structures, and roadway inspections, Remote Terminals 111 provide an inspector with configurable task lists, asset management information, enterprise maintenance plan, and measuring points. In addition, EAM System 100 allows metadata to be passed with documents sent to the inspectors.

The Track Inspection System, which will be used as an example for describing the operation of EAM System 100, includes all of these features, along with additional features, including track Point and linear inspection data, offline track charts (GIS), offline linear referencing (GIS), management of linear inspection compliance at an operation sub-linear range level, application of LDC characteristics down to lower assets, and offline linear referencing (GIS). The GIS capability is also advantageously applied to the inspection of signals, structures, and critical shop equipment.

In the case of inspections, User Interface 113 on each Remote Terminal 111 relates disparate information regarding physical assets, pending and historical inspections, and defects previously recorded regarding an asset. This information is used to guide the inspector through a physical inspection of the asset to ensure that all necessary inspection stops are performed and the required data gathered. In addition, EAM System 100 creates electronic inspection records that include quantifiable measurement information obtained during the course of each inspection and associates those records with precise geographical location information. (In contrast, the existing technology does not demonstrate the relationship of assets, inspections, and defects in conjunction with geographic information regarding the location of the assets.) Furthermore, inspectors can work-off line, which conserves network bandwidth, supports inspections in locations where network connections are unavailable or marginal, and provides inspectors flexibility of movement.

Returning to FIG. 3, MobiLink Server 208 allows for the synchronization of data on remote terminals 111, which allows remote terminals 111 to work offline. As shown in FIG. 4, the rail network is divided into territories for purposes of inspections. Local Database 114 associated with MobiLink Server preferably has a template database architecture that is partitioned by territory. In FIG. 3, Local Database 114 is shown partitioned for four (4) territories 301 *a*-301 *d*, although in actual practice the number and size of the territories may vary widely, depending on the rail network and the operating railroad. Each territory partition 301 *a*-301 *d* is populated with base data for the corresponding geographical territory.

Partitioning of Local Database 114 associated with MobiLink Server 208 realizes a number of significant advantages. Among other things, synchronization of Remote Terminals 111 across different territories is independent, which improves database access times, especially when numerous inspectors are operating in the field. In addition, each database partition can be optimized for the track, structural, signal, and roadway inspection requirements for the corresponding territory.

When an inspector logs in through a remote terminal 111, remote terminal 111 determines the proper territory for that inspector and ensures that Local Database 114 on remote terminal 111 is populated with the data for that territory. Preferably, remote terminal determines an inspector's default territory the first time that inspector logs in. Once the proper territory is determined, remote terminal 111 requests the necessary database 301 (FIG. 3) through MobiLink Client 213. Inspectors can download the data for any territory and switch between territories as needed. When an inspector logs out and logs back in later, Local Database 114 on the Remote Terminal 111 is synchronized to the last territory used by that inspector, using the procedure discussed above.

When an inspector works offline, the information displayed on User Interface 113 of the Remote Terminal 111 is generated from the current data within Local Database 114. Data input by the inspector through User Interface 113 is stored in Local Database 114. When the inspector reconnects to Network 110, the data with in Local Database 114 and the corresponding territory partition within Local Database 109 associated with MobiLink Server 208 are synchronized. Those data are then exchanged with ECC 101 through Gateway 104, which performs authentication and applies security procedures.

Figure 5B:
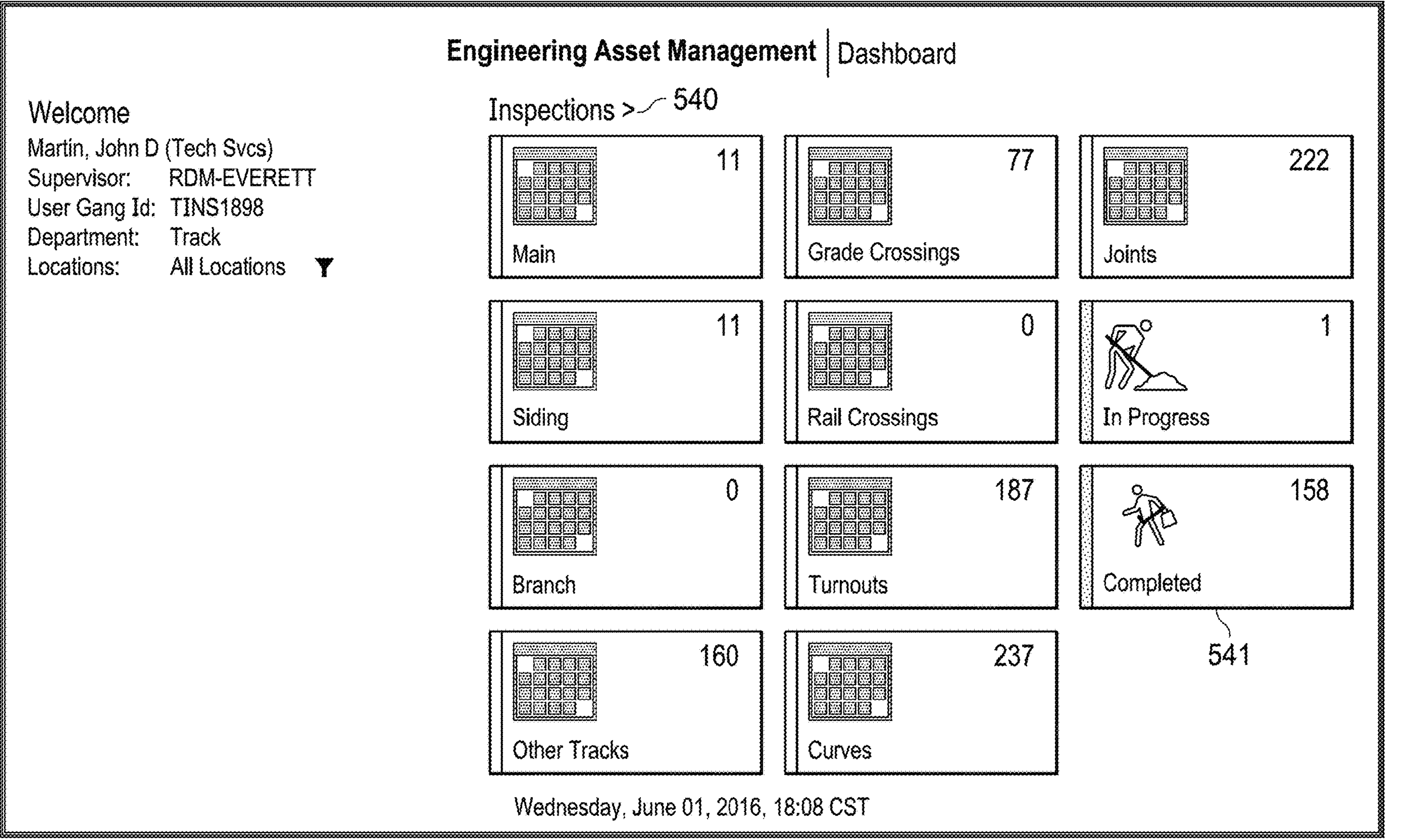
FIG. 5B is a diagram illustrating the inspections portion of an exemplary dashboard presented on a given one of the remote terminals of FIGS. 1-3 for initiating the inspections branch of the process shown in FIG. 5A.

FIG. 5A is a high-level flow chart demonstrating Procedure 500 of navigating through the options provided by the Graphical User Interface 113 presented on a given remote terminal 111. Exemplary screens provided by the graphical user interface are shown in FIGS. 5B-5G for a representative embodiment of EAM System 100, although the content and format of each screen may varying in actual practice.

Figure 5C:
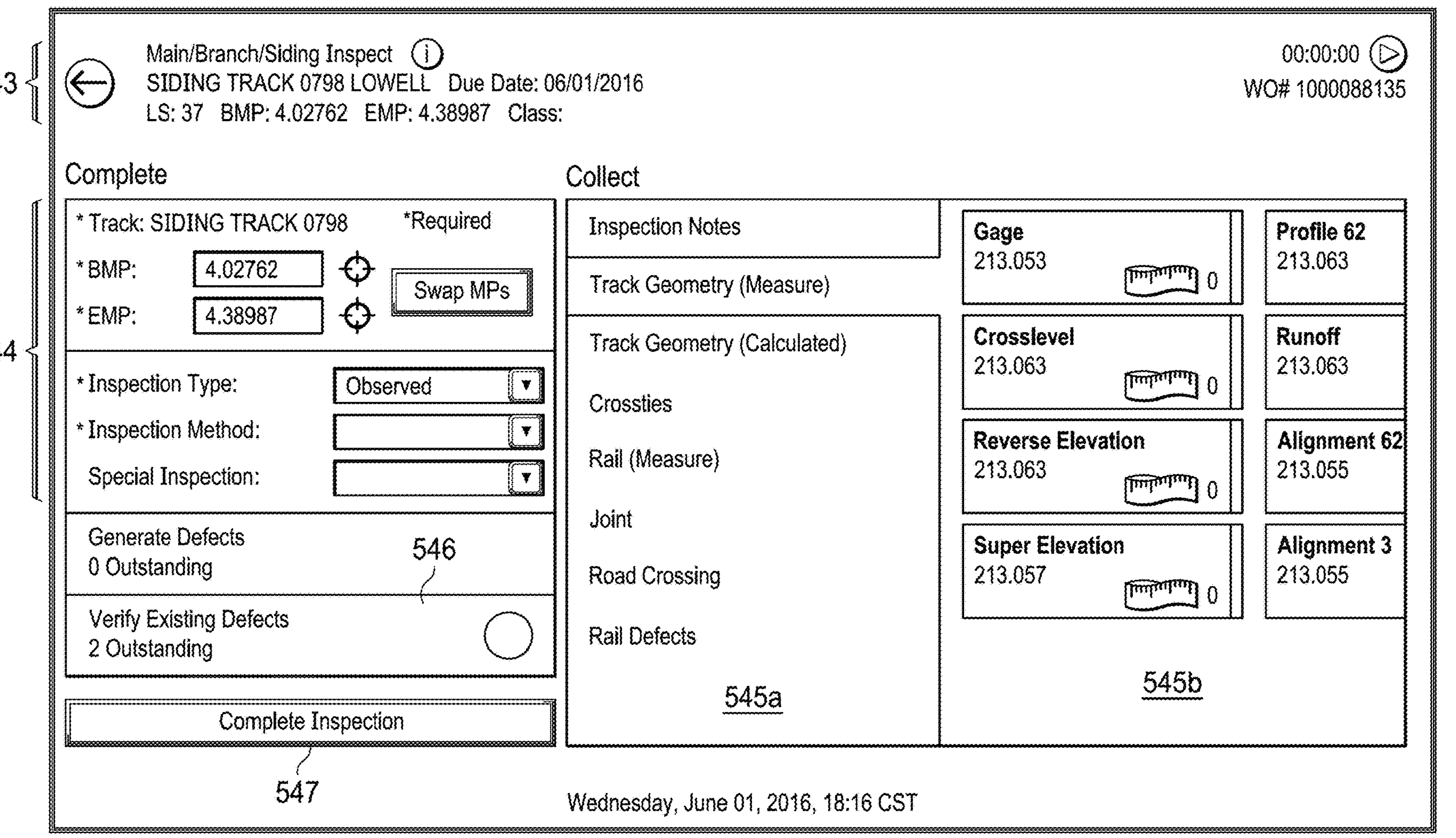
FIG. 5C is a diagram illustrating a preferred screen for a siding inspection, as accessed by navigation through the inspections dashboard screen of FIG. 5B.

The OData protocol provides the flexibility needed to support the data exchanges with EAM system 100. The data model can be design in various ways, as known in the art using entities, entity sets (collections), properties, and queries, such as filters and nested filters. For example, inspections, inspection details, and inspection steps can be modeled as associated collections (entity sets) with navigation properties allowing an inspector to navigate between them (See FIGS. 5B and 5C). Similarly, within entities such as inspection steps, associations and navigation properties allow an inspector to read and enter specific information corresponding to specific inspections being performed. For example, an inspection of track geometry may navigate to an entity allowing for the input of data from each of the required steps, such as measurements of gage, crosslevel, reverse elevation, super elevation, profile, runoff, and alignment, as shown in FIG. 5C.

At Block 501, the end user (e.g., a railroad inspector) logs-in to the associated remote terminal 111 through Dashboard 502. Dashboard 502 provides the end user with a Change Supervisor option 503 and a Help option 504.

When the remote terminal 111 connects to MobiLink Server 208, the database synchronization process discussed above is initiated (Block 510). The status of the synchronization process is displayed as Pending (Block 511), Successful (Block 512), or subject to an Error (Block 513).

At Blocks 520 and 521, the inspector can view of list of assets within the assigned territory, such as main lines, grade crossings, rail crossings, sidings, and the like. A filter flyout allows the inspector to focus on a particular type or category of assets (Block 522) and make a selection. (A representative flyout is discussed below in conjunction with FIG. 5C).

After an asset or set of assets has been selected through the flyout, a screen under an Assets Header (Block 523) allows the end user to view the characteristics of the asset or set of assets in further detail (Block 524). At Block 525, the end user may edit asset information, when authorized, as well as access a tree view (Block 526). The detailed information under the Assets Header may include asset notes, begin mile post, end mile post, track status, alias name of track, asset attributes, and asset status.

From the Dashboard (Block 502), the end user accesses Notifications at Block 530, which presents a list of Notifications (Block 531), with filtering provided by a flyout at Block 532. After the inspector selects a Notification through the flyout, a screen is presented under a Notifications Header (Block 533), which provides details for the selected Notification (Block 534). The inspector may also create Notifications at Block 535, with created Notifications added to the Notification view list of Block 531. A Notification may include such information such as a description of an event or asset condition, the start point (beginning mile post), the endpoint (ending mile post), notification notes, one or more defect codes, and remedial action take or to be taken.

Inspections are accessed from Dashboard 502 at Block 540, where the inspector can bring up a list at Block 541. From the list, the inspector can access a flyout for filtering the listed inspections (Block 542, FIG. 5A). FIG. 5B depicts an exemplary Inspection screen including a list of track inspections outstanding (i.e., 11 main track inspections, 222 joint inspections, and 187 turnout inspections), as well as inspections in progress (i.e. 1) and completed inspections (i.e., 158). Contact on the window corresponding to an inspection type generates the flyout.

Once a selection is made using the flyout, an Inspection screen is presented under an Inspections Header (Block 543). The inspection header may include information identifying the asset to be inspected and the inspection due date.

FIG. 5C illustrates a representative inspection screen appearing for the inspection of a siding track, in this case Inspection Header 543 identifies the asset as Siding Track 0798 associated with the Lowell Station and located on Line Segment (LS) 37 between begin milepost (BMP) 4.02762 and end milepost 4.38987. The due date for the inspection is Jun. 1, 2016.

The inspector uses the inspection screen appearing under Inspection Header 543 to input information during the course of the inspection. At Block 544, the inspector inputs completed inspection details such as inspection status, begin milepost, ending milepost, inspection type, inspection method, inspection reason, start time and date, duration and whether a road master is present.

At Block 545 of FIG. 5A, the inspector is guided through the inspection steps required for the inspection. In the example shown in FIG. 5B, a list 545*a* is provided for selecting between inspection notes, track geometry measurements, track geometry calculations, crosstie inspections, rail measurements, joint inspections, road crossing inspection, and rail defects. In FIG. 5B, the track geometry measurement entry has been selected, which brings up a flyout 545*b* allowing for entry of the particular information required to be taken and entered during the inspection. In this case, flyout 545*b* indicates that the inspector must obtain and input information including on gage, crosslevel, reverse elevation, super elevation, profile 62, and runoff.

Any defects found during the inspection are verified at Block 546 of FIG. 5A using verification window 546 of FIG. 5B. At Block 547 of FIG. 5A, the inspection is completed using the completion window of FIG. 5B. Once the inspection is completed, the inspection details are validated by the Remote Terminal 111 (Block 548) and the inspector inputs his or her time entry (Block 549).

From inspection details input at Block 544, the asset details are updated by returning to the edit asset Block 525. In addition, an end user of a Remote Terminal 111 can create an inspection under the inspections header (Block 543) through the assets header (Block 523) at Block 550.

The Dashboard (Block 502) allows the end user of Remote Terminal 111 to access GIS (Geographical Information System) information during either online or offline operation. In the preferred embodiment of EAM System 100, this geo map information is selected, at Block 561, from either map view data (Block 560), track charts (Block 562), or street view data (Block 563). (Alternatively, the map view can be accessed at Blocks 502, 521, 523, 531, 533, 541, or 543. In addition, differing presentations of the map data are available at 562 and 563.) The geo map information is navigated using a table of contents (Block 564), a legend provided with each accessed map or map segment (Block 565), and asset/inspection flyouts (Block 566).

Figure 5D:
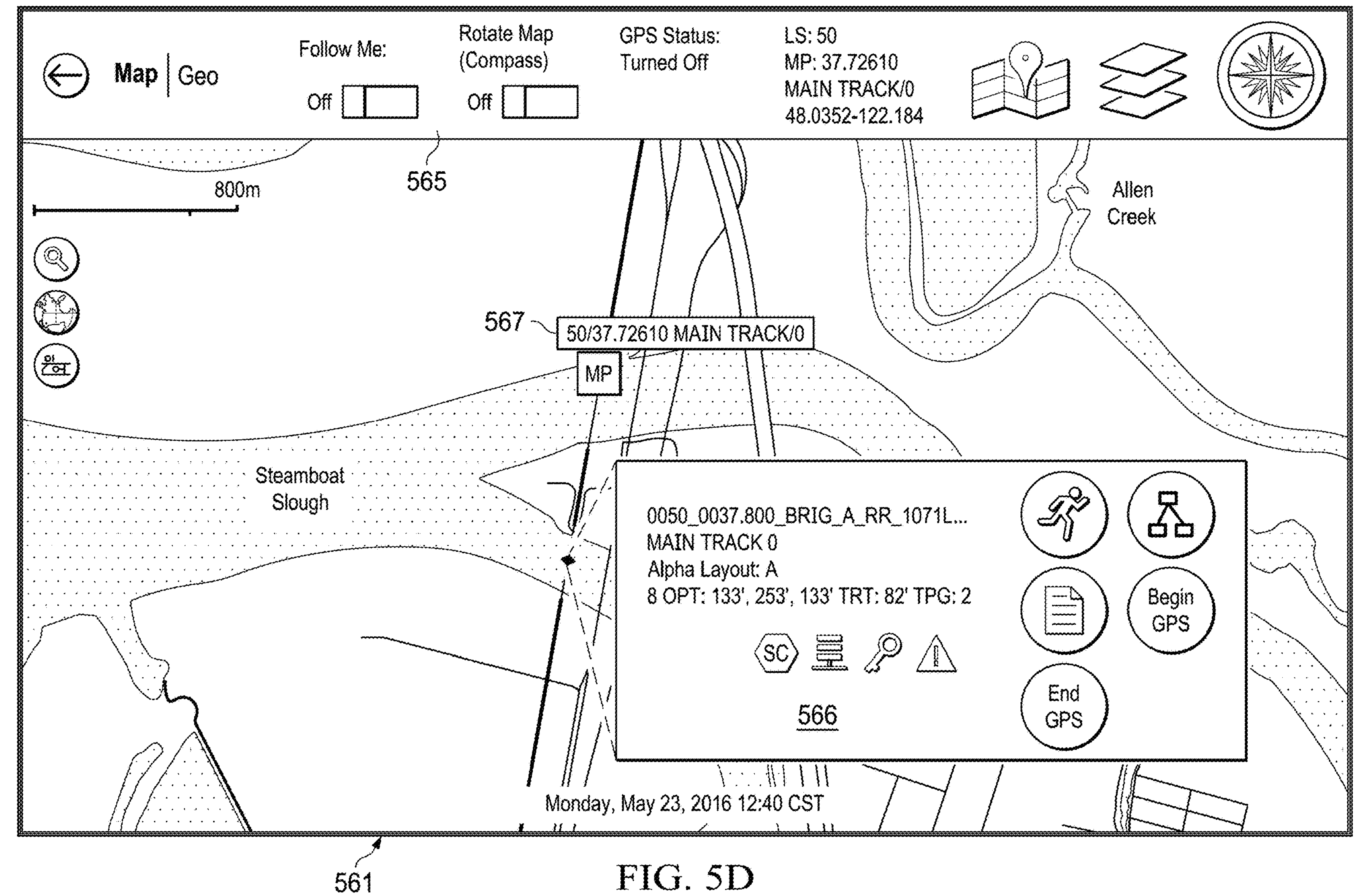
FIG. 5D is a diagram showing an exemplary geographical information system (GIS) map displayed on a given one of the remote terminals of FIGS. 1-3.

FIG. 5D shows an exemplary geo map displayed on the screen of a Remote Terminal 111, which includes a legend 565, a flyout 566, and an asset locator 567. Legend 565 includes controls (e.g., rotate map), status information (e.g., GPS status), and information describing the presented view. In this example, the view is referenced to Line Segment (LS) 50, Mile Post 37.72610, on Main Track 0, at Latitude 48.0352 and Longitude −122.184. An identifier 567 including the identifier (main track 0), line segment and mile post is provided on the map itself.

Figure 5E:
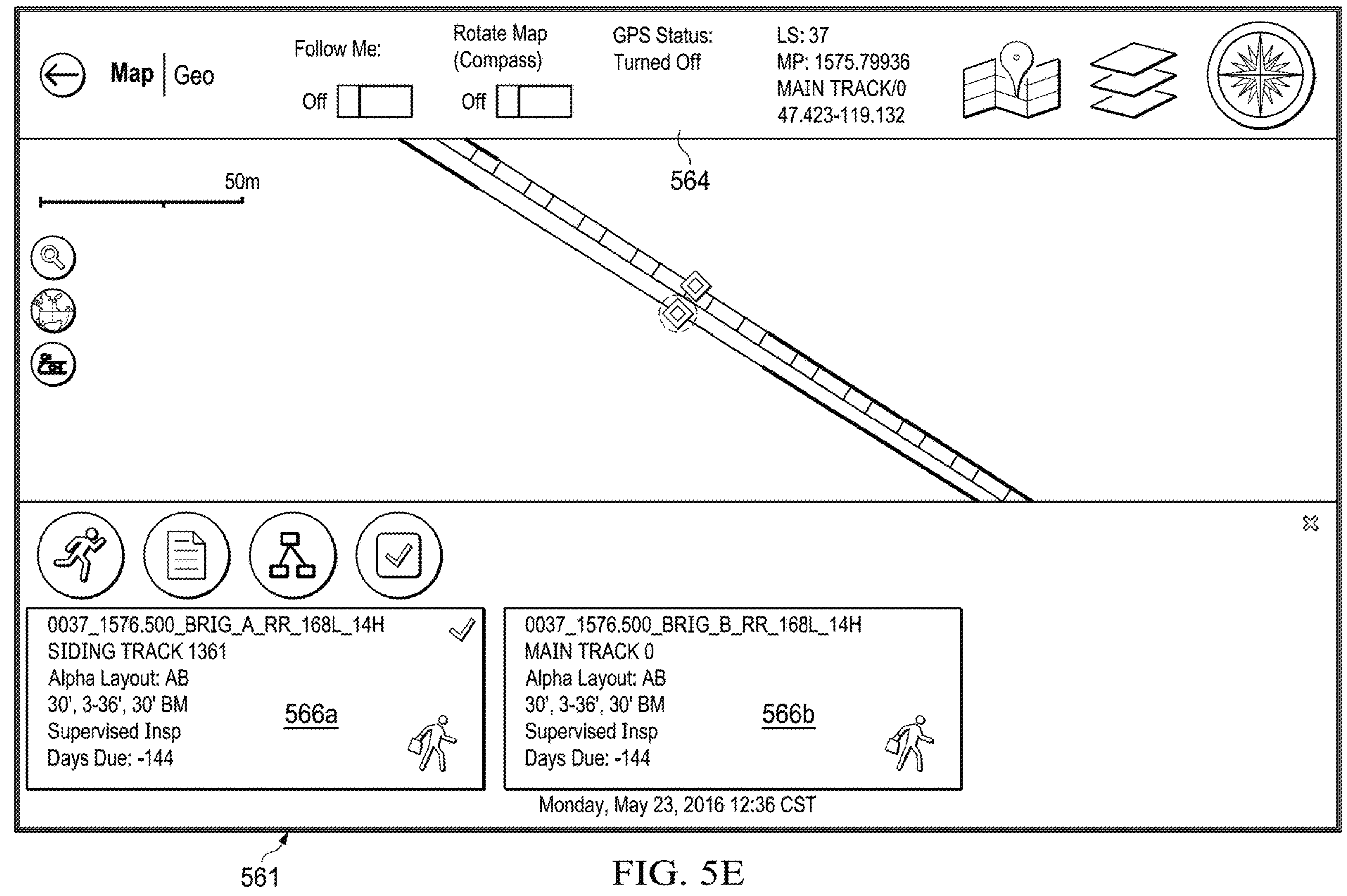
FIG. 5E is another diagram showing particular assets displayed on a GIS map.

A flyout 566 provides specific information on an asset shown on the map. In the example of FIG. 5D, the asset is identified as a bridge on line segment 50 at mile post 37.800 on main track 0. The flyout also provides the general characteristics (attributes) of the bridge FIG. 5E provides another exemplary geo map, where the view is referenced to Main Track 0, Line Segment 37, mile post 1575.79936, latitude 47.423, and longitude −119.132. The flyout provides information for two parallel bridges, one on siding track 1361 and one on main track 0. In addition, flyout indicates when the next inspection is due.

Figure 5F:
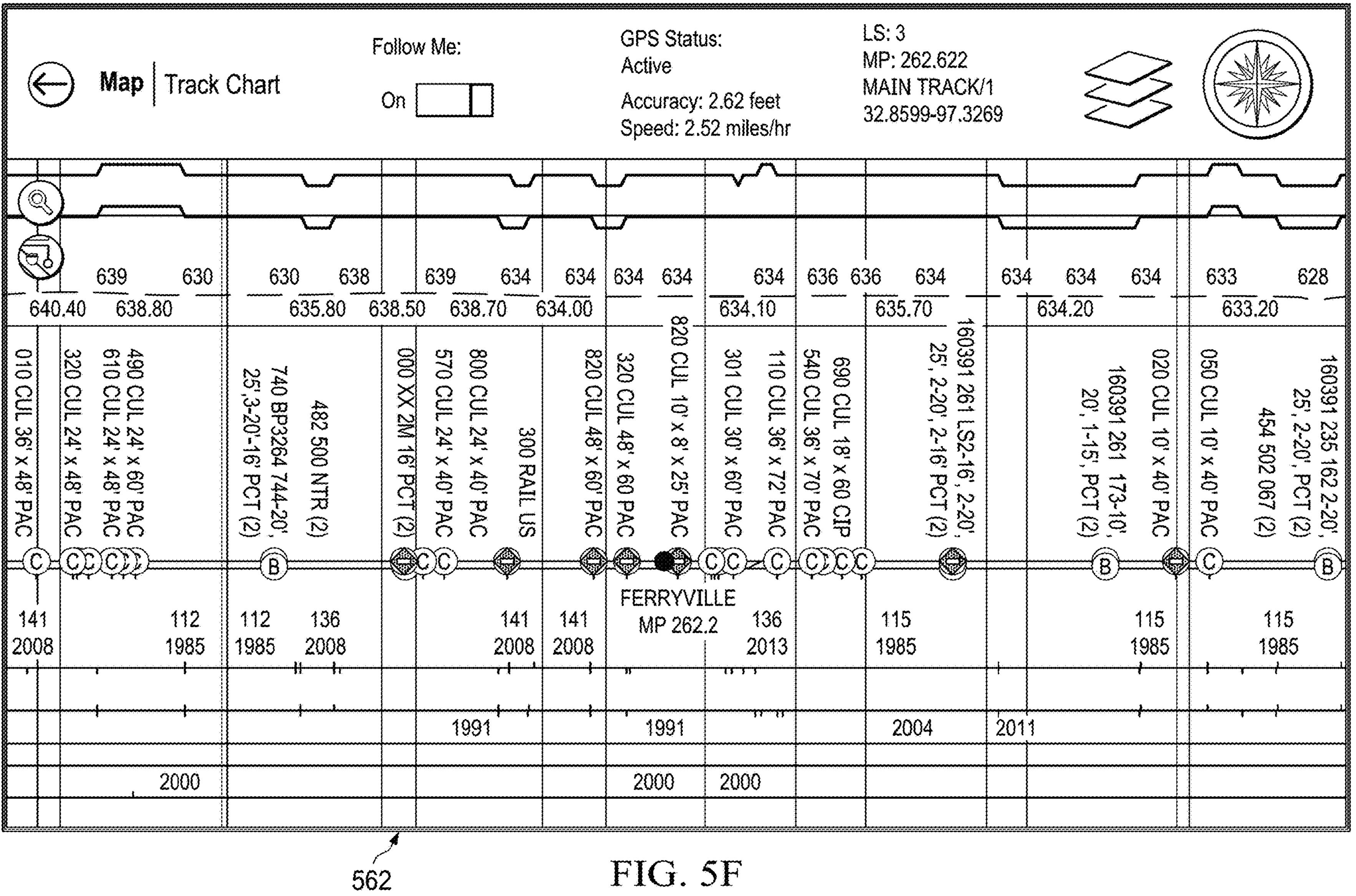
FIG. 5F is a diagram showing an exemplary engineering track chart displayed on a given one of the remote terminals of FIGS. 1-3.

An example of a track chart displayed on a Remote Terminal 111 is shown in FIG. 5F. Track charts generally show engineering details such as physical state, grade, track configuration, stations, bridges, grade crossings, rail yards, structures, speed limits, signals, rails, and ties. In FIG. 5F, GPS receiver 113 is turned on, given a location accuracy of 2.62 feet while Remote Terminal 111 is in motion (e.g., the end user moving on a railed vehicle).

Figure 5G:
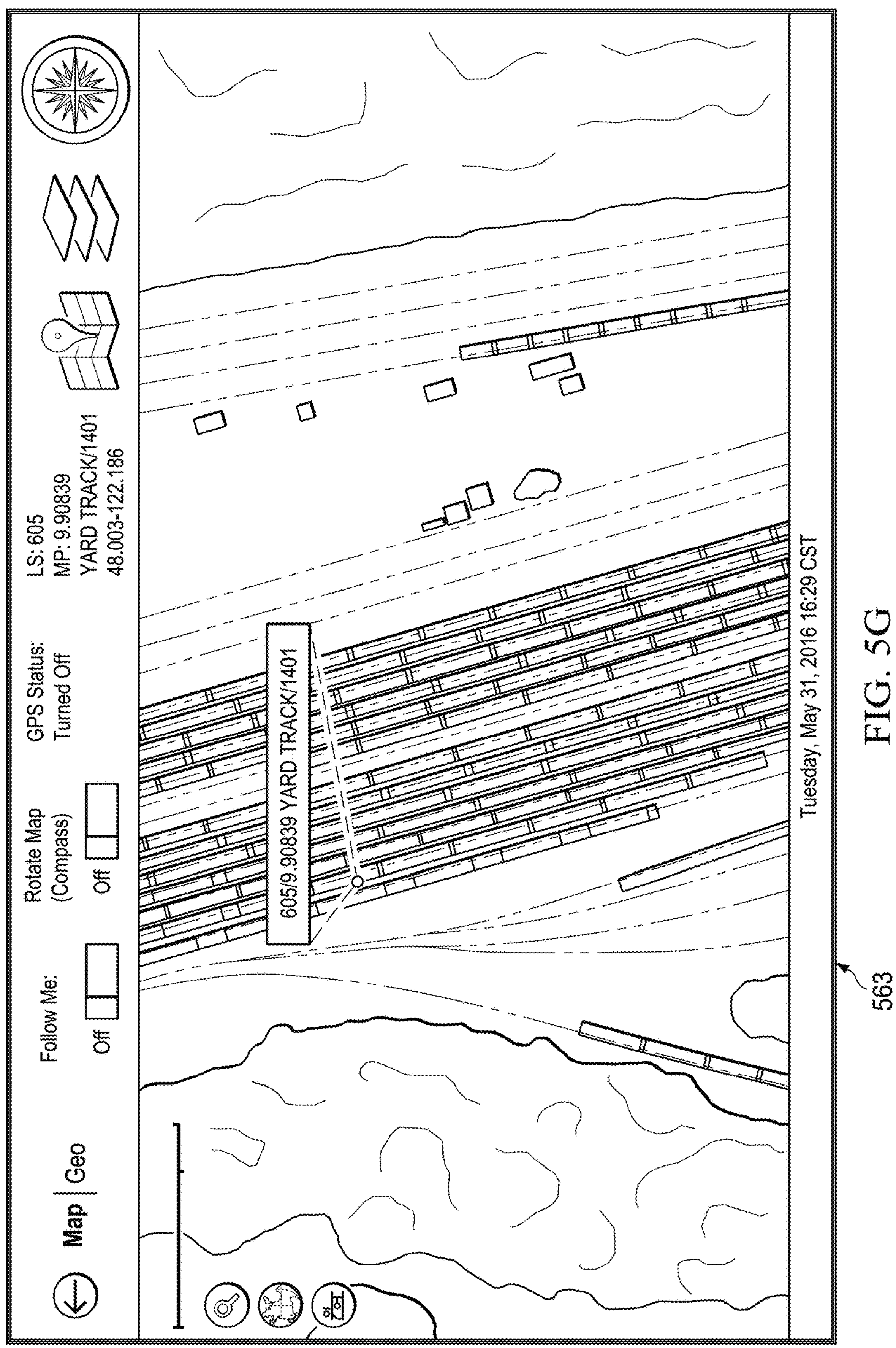
FIG. 5G is a diagram showing an exemplary Mercator projection GIS displayed on a given one of the remote terminals of FIGS. 1-3.

FIG. 5G illustrates a Mercator projection displayed on a Remote Terminal 111, in this example for rail yard Track 1401 on Line Segment 605, Mile Post 9.090839 (Latitude 48.003, Longitude −122.186).

In order for an asset (e.g., bridges, signals) to be accurately mapped, precise GIS location information for the asset with respects to specific reference points, such as mile posts and track location, must be known. With current mapping technologies, asset location information often does not correlate exactly with the location information for the associated rail network, which can cause assets to not display on the track. For example a bridge may appear several hundred yards off the track on the electronic map.

Moreover, the ability of accurately map assets is further limited in the presence of motion, such as when an inspector is traversing a section of rail within a rail vehicle. Finally, mapping asset location to specific reference points must be possible in both offline and online modes of remote terminals 111, to give inspectors maximum flexibility in the field.

The preferred embodiment of EAM System 100 uses linear referencing during the generation of the geo maps displayed on Remote Terminals 111. With linear referencing, assets are mapped on the track network based on their GPS coordinates or line segment/mile post (LS/MP).

Generally, linear referencing calculates the closet track position and represents the asset at that location on the track. In addition, linear referencing uses geometric calculations to determine the milepost location where the asset was placed on the track, providing critical location information in a industry standard unit of measure.

Linear referencing is used to map assets onto both the traditional Mercator projection maps (FIG. 5G) and onto rail road specific engineering track charts (FIG. 5F). Advantageously, linear referencing supports the mapping of stationary assets, as well as assets in motion such a rail vehicle traversing the rail network.

Figure 6A:
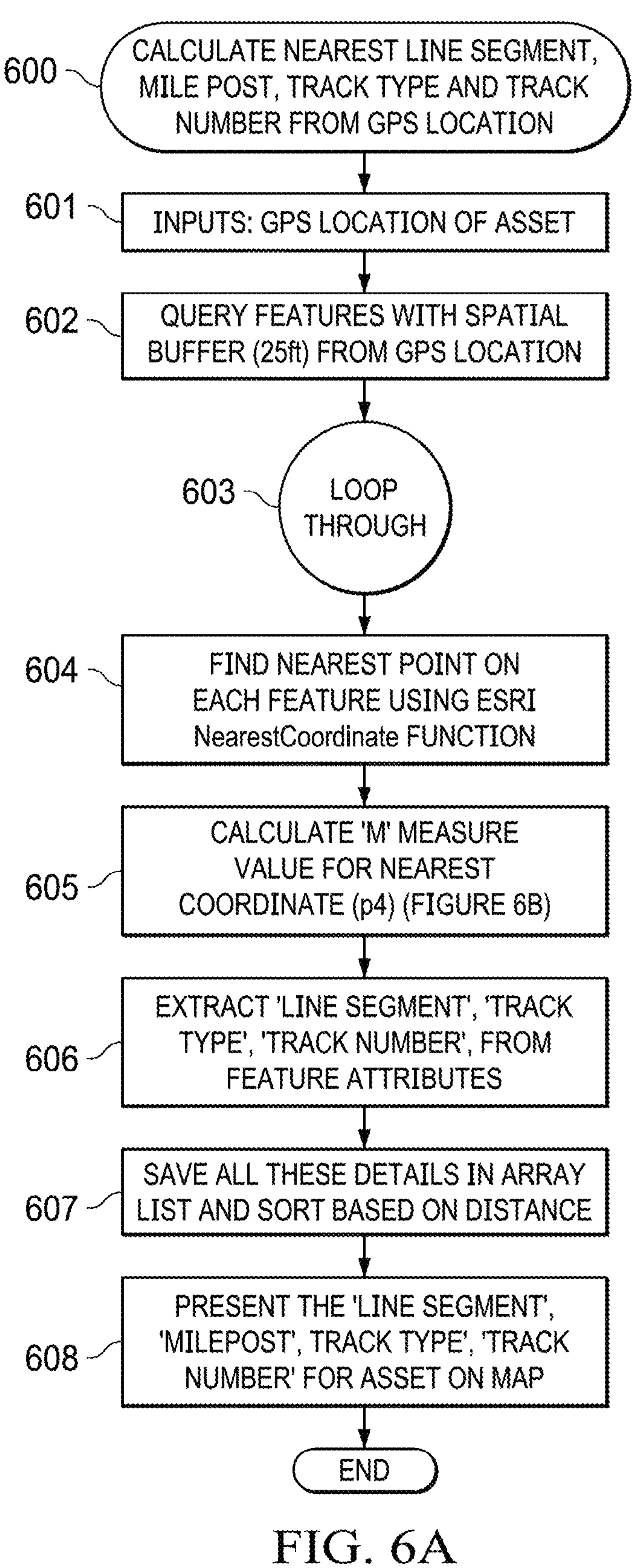
FIG. 6A is a flow chart of a preferred procedure for calculating the nearest line segment, mile post, and track number from the GPS location data of a given asset and mapping that asset to a GIS map.

FIG. 600 of FIG. 6A illustrates a preferred procedure 600, executed on a Remote Terminal 111, which allows the nearest line segment, mile post, track type, and track number to be determined for a given asset. Using this information, the asset can be accurately placed on the rail network depicted in the geo map. At Block 601, the GPS location for the asset is taken using GPS Receiver 115 of Remote Terminal 111. GPS Receiver 115 can be stationary or in motion.

At Block 602, asset features stored as GIS data in Local Database 114 of Remote Terminal 111 are queried with a spatial buffer to identify previously mapped features within a predetermined distance of the GPS measurement point, which in the preferred embodiment is 25 feet. In the example shown in FIG. 6B, the assets are two parallel railroad tracks represented by two polylines as features.

Figure 6B:
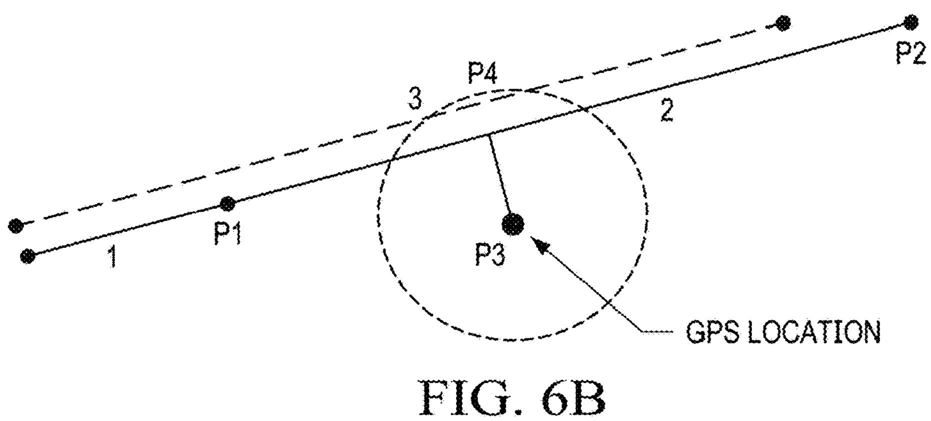
FIG. 6B is a diagram illustrating the calculation of the measure value for the nearest point on the railroad line segment to the GPS location point.
Figures 1, 6C:
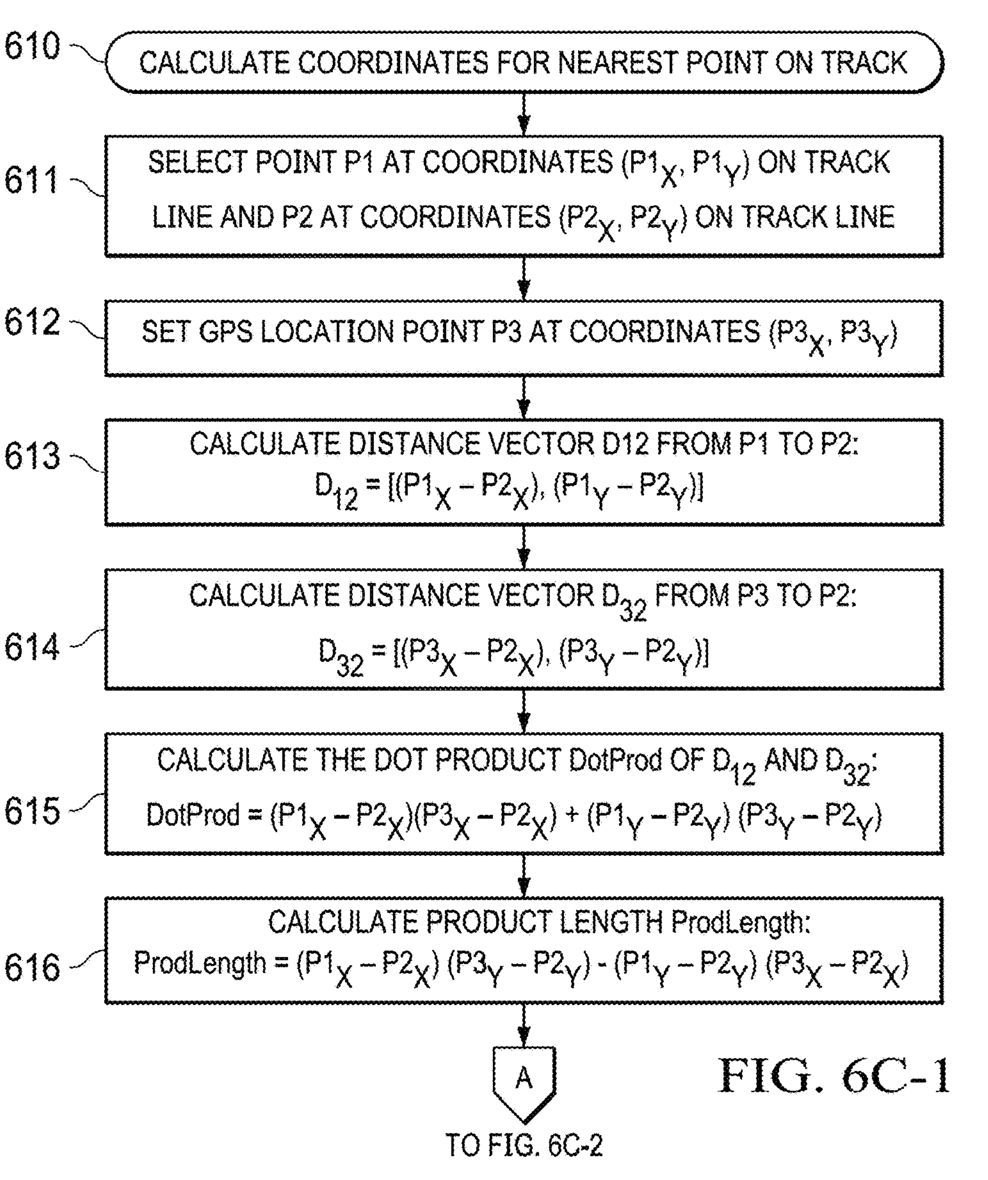
Figures 2, 6C:
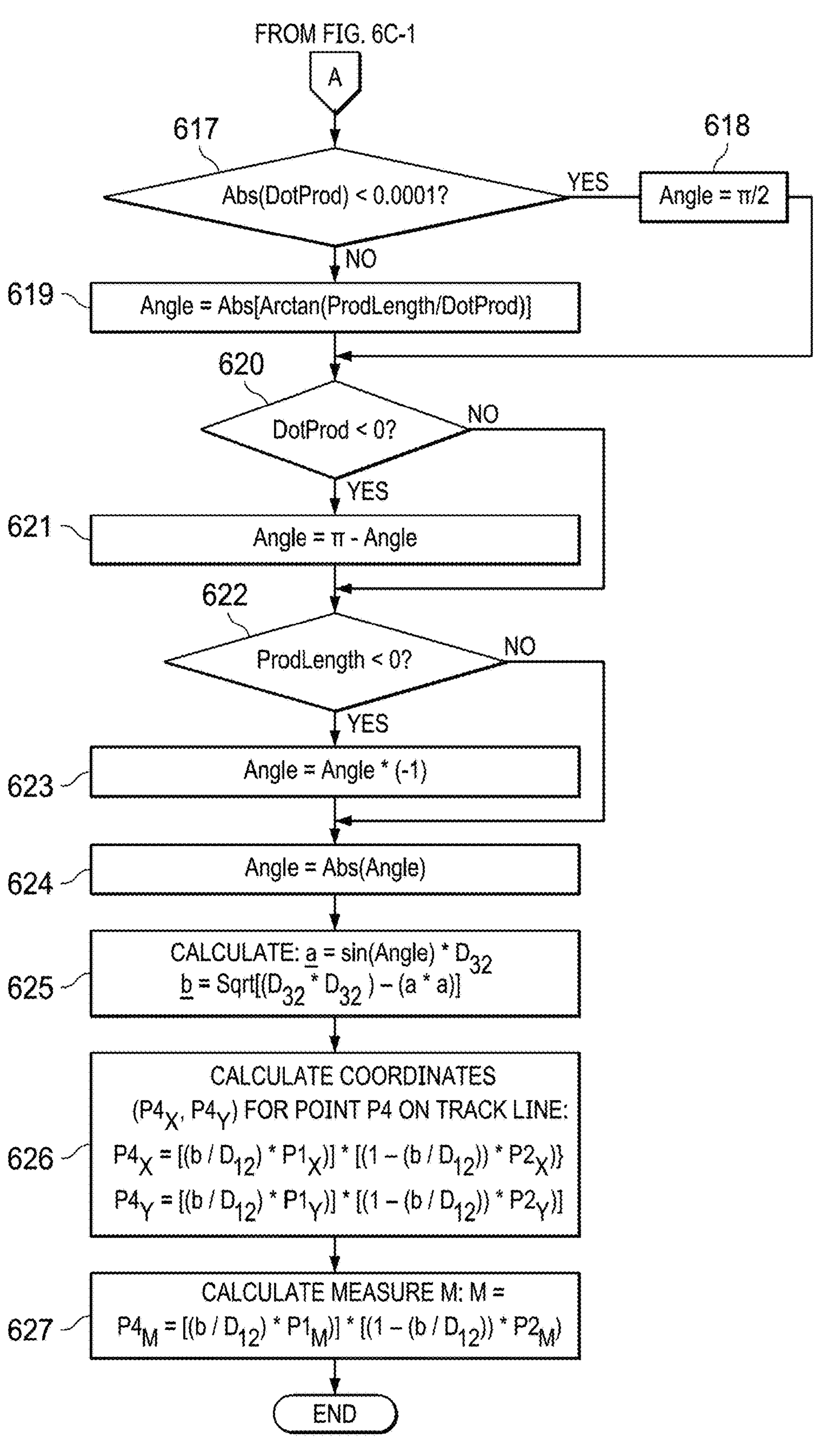

Procedure 600 loops through the identified features at Block 603 to find the nearest point on each feature at Block 604. In the preferred embodiment of EAM System 100, this process uses the NearestCoordinate feature of an ERSI GIS software system. In the example of FIG. 6B, the nearest coordinates to the GPS measurement point are calculated for each of the pair of polylines representing the tracks.

At Block 605, a measured value M is calculated for the nearest coordinate (P4) on the nearest of the two polylines using Procedure 610 shown in FIG. 6B. In the preferred embodiment of EAM System 100, the measured value M represents the mile post (i.e., the universal metric for railroads) to which the asset is being mapped; however, in alternate embodiments a different metric may be used.

At Block 611 of Procedure 610 of FIG. 6B, two points P1 and P2 are selected on the track line respectively at coordinates ($P1_x$, $P1_y$) and ($P2_x$, $P2_y$). The measured GPS point P3 is set to coordinates ($P3_x$, $P3_y$) at Block 612.

The distance vector D12 from P1 to P2 is calculated at Block 613 as:

$$D12=[(P1_x-P2_x),(P1_y-P2_2)]$$

At Block 614, the distance vector D32 from P3 to P2 is calculated as:

$$D32=[(P3_x-P2_x),(P3_y-P2_y)]$$

The dot product of the distance vectors D12 and D32 is taken at Block 615 as:

$$DotProd=(P1_x-P2_x)\ (P3_x-P2_x)+(P1_y-P2_y)\ (P3_y-P2_y)$$

At Block 616, the product length is calculated as:

$$ProdLength=(P1_x-P2_x)\ (P3_y-P2_y)-(P1_y-P2_y)\ (P3_x-P2_x)$$

At decision Block 617 the absolute value of the dot product is compared against a constant:

If Abs(DotProduct)<0.0001, then Angle=π/2 (Block 618);

Otherwise Angle=Abs[Arctan(ProdLength/DotProd)] (Block 619).

At decision Block 620 the sign of the dot product is determined:

If DotProd<0

Then Angle=Angle−π (Block 621);

Otherwise continue to Block 622.

At decision Block 622 the sign of the product length is determined:

If ProdLength<0 then Angle=Angle*(−1) (Block 623);

Otherwise continue to Block 624.

At Block 624 the absolute value of Angle is taken:

Angle=Abs(Angle)

The variables a and b are calculated at Block 625 as:

$$a=\sin(\text{Angle})*D32$$

$$b=Sqrt(D32*D32)-(a*a)]$$

The coordinates (P4x, P4y) for point P4 on the track line are then calculated at Block 626 as:

$$P4_x=[(b/D12)*P1_x)]*[(1-(b/D12))*P2_x)]$$

$$P4_y=[(b/D12)*P1_y)]*[(1-(b/D12))*P2_y)]$$

The measure value M is finally calculated at Block 627 as:

$$P4_M=[(b/D12)*P1_M)]*[(1-(b/D12))*P2_M)],$$

where $P4_M$ is milepost at P4, the position on the map feature to which the asset will be mapped, $P1_M$ is the milepost at point P1 on the map feature, and $P2_M$ is the milepost at point P2 on the map feature.

Returning to Procedure 600 of FIG. 6A, at Block 606 the Line Segment, Track Type, and Track Number are extracted from the feature attributes of the feature (e.g., track segment) at the calculated milepost. At Block 607, the details collected Block 606 are saved in an array and sorted based on distance. The asset being mapped is then overlaid over the rail network on the electronic map or track chart at point P4 and associated with the attributes of the previously mapped features, for example, the Line Segment, Milepost, Track Type, and Track Number when the previously mapped feature is railroad track. For example, in FIG. 5D, the bridge described by flyout 566 is mapped to a point on Main Track 0, Line Segment 50, and Milepost 37.72610. Similarly, in FIG. 5E, the bridge characterized by flyout 566*a* is mapped to Siding Track 1361, Line Segment 37, and Milepost 1575.79936.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A railroad asset inspection management system comprising:

a plurality of remote terminals, wherein each remote terminal includes one or more processors and a memory communicatively coupled to the one or more processors, each one of the plurality of remote terminals including:

a user interface for presenting received inspection work orders and inputting railroad asset inspection information; and a local database for storing the received inspection work orders, Geographic Information System (GIS) data, and the input railroad asset inspection information;

wherein each remote terminal is operable to:

measure a global positioning system (GPS) position of a railroad asset; and present a position of the remote terminal on a visual representation presented by the user interface at a point on a railroad track nearest to the measured GPS position along with a milepost, a line segment, and a track number of the railroad track, wherein the point on the railroad track nearest to the measured GPS position is different from the measured GPS position of the railroad asset; and a processing system operable to:

query the GIS data stored in the local database for railroad tracks within a spatial buffer from the GPS position;

identify, in response to querying for the railroad tracks, the railroad track within a predetermined distance of the GPS position of the railroad asset;

calculate coordinates of the point on the railroad track nearest to the measured GPS position based, at least in part, on a first distance vector, a second distance vector, a dot product of the first and second distance vectors, and a product length of the first and second distance vectors, wherein the first distance vector is calculated using two other points on the railroad track;

determine the milepost, line segment, and track number for the coordinates of the point on the railroad track nearest to the measured GPS position;

associate the measured GPS position with the line segment, and track number of the railroad track; and communicate information to the remote terminal for presenting the position of the remote terminal on the visual representation relative to the point on the railroad track nearest to the measured GPS position, along with the milepost, line segment, and track number of the railroad track.

2. The system of claim 1, wherein the visual representation comprises a railroad engineering chart.

3. The system of claim 1, wherein the visual representation comprises a geographical information system (GIS) map representing a portion of a railroad track network.

4. The system of claim 1, wherein the processing system is further operable to:

determine a first distance between first and second points on the railroad track;

determine a second distance between the first point on the railroad track and the GPS position of the railroad asset;

determine from the first and second distances coordinates for the point on the track nearest to the measured GPS position of the railroad asset; and determine the milepost for the railroad asset from mileposts for the first and second points on the track.

5. The system of claim 1, wherein the railroad asset is a mobile asset.

6. The system of claim 1, wherein:

the user interface for presenting the received inspection work orders and the inputted railroad asset inspection information comprises a plurality of input areas for receiving the railroad asset inspection information; and the plurality of input areas for receiving the railroad asset inspection information comprises:

a gage input area;

a crosslevel input area;

a reverse elevation input area;

a super elevation input area; and a runoff input area.

7. A railroad asset inspection management system comprising:

a plurality of remote terminals, wherein each remote terminal of the plurality of remote terminals includes one or more processors and a memory communicatively coupled to the one or more processors, and wherein each remote terminal of the plurality of remote terminals includes a user interface for presenting received inspection work orders and inputting railroad asset inspection information and a local database for storing the received inspection work orders, Geographic Information System (GIS) data, and the input railroad asset inspection information, each remote terminal operable to:

measure a global positioning system (GPS) position of a railroad asset; and present a position of the remote terminal on a visual representation presented by the user interface at a point on a railroad track nearest to the measured GPS position along with a milepost, a line segment, and a track number of the railroad track, wherein the point on the railroad track nearest to the measured GPS position is different from the measured GPS position of the railroad asset; and at least one server including a server database for storing railroad asset inspection information and inspection work orders of a railroad network, wherein the at least one server is operable to:

synchronize the local database of a selected remote terminal with the server database when the selected remote terminal establishes a connection with the server;

query the GIS data stored in the local database for railroad tracks within a spatial buffer from the GPS position;

identify, in response to querying for the railroad tracks, the railroad track within a predetermined distance of the measured GPS position;

calculate coordinates of the point on the railroad track nearest to the measured GPS position based, at least in part, on a first distance vector, a second distance vector, a dot product of the first and second distance vectors, and a product length of the first and second distance vectors, wherein the first distance vector is calculated using two other points on the railroad track;

determine the milepost, line segment, and track number for the coordinates of the point on the railroad track nearest to the measured GPS position;

associate the GPS position with the line segment, and track number of the railroad track; and communicate information to the remote terminal for presenting the position of the remote terminal on the visual representation relative to the point on the railroad track nearest to the measured GPS position, along with the milepost, line segment, and track number of the railroad track.

8. The system of claim 7, wherein the server database is partitioned into a plurality of database partitions each for storing railroad asset inspection information and inspection work orders corresponding to a territory of a railroad network, wherein the server is operable to synchronize the local database of a selected remote terminal with the server database when the selected remote terminal establishes a connection with the server by:

transferring changes in the work orders from the partition of the server local database corresponding to the territory in which the selected remote terminal is operating to the local database of the selected remote terminal; and transferring changes to the input railroad asset inspection information from the local database of the selected remote terminal to the partition of the server local database corresponding to the territory in which the selected remote terminal is operating.

9. The system of claim 7, wherein the visual representation comprises a railroad engineering chart.

10. The system of claim 7, wherein the visual representation comprises a geographical information system (GIS) map representing a portion of a railroad track network.

11. The system of claim 7, wherein the at least one server is further operable to:

determine a first distance between first and second points on the railroad track;

determine a second distance between the first point on the railroad track and the GPS position;

determine from the first and second distances coordinates for the point on the track nearest to the measured GPS position; and determine the milepost for the railroad asset from mileposts for the first and second points on the track.

12. The system of claim 7, wherein the railroad asset is a mobile asset.

13. A railroad asset inspection management system comprising:

a plurality of remote terminals, wherein each remote terminal of the plurality of remote terminals includes one or more processors and a memory communicatively coupled to the one or more processors, and wherein each remote terminal of the plurality of remote terminals includes a user interface for presenting received inspection work orders and inputting railroad asset inspection information and a local database for storing the received inspection work orders, Geographic Information System (GIS) data, and the input railroad asset inspection information, wherein each of the plurality of remote terminals is operable to:

measure a global positioning system (GPS) position of a railroad asset; and present the GPS position on a visual representation presented by the user interface at a point on a railroad track nearest to the measured GPS position along with a milepost, a line segment, and a track number of the railroad track, wherein the point on the railroad track nearest to the measured GPS position is different from the measured GPS position of the railroad asset; and at least one server including a server database partitioned into a plurality of database partitions each for storing railroad asset inspection information and inspection work orders corresponding to a territory of a railroad network, the at least one server operable to:

synchronize the local database of a selected remote terminal with the server database when the selected remote terminal establishes a connection with the server by:

transferring changes in the work orders from the partition of the server local database corresponding to the territory in which the selected remote terminal is operating to the local database of the selected remote terminal; and transferring changes to the input railroad asset inspection information from the local database of the selected remote terminal to the partition of the server local database corresponding to the territory in which the selected remote terminal is operating;

query the GIS data stored in the local database for railroad tracks within a spatial buffer from the GPS position;

identify, in response to querying for the railroad tracks, the railroad track within a predetermined distance of the measured GPS position;

calculate coordinates of the point on the railroad track nearest to the measured GPS position based, at least in part, on a first distance vector, a second distance vector, a dot product of the first and second distance vectors, and a product length of the first and second distance vectors, wherein the first distance vector is calculated using two other points on the railroad track;

determine the milepost, line segment, and track number for the coordinates of the point on the railroad track nearest to the measured GPS position;

associate the railroad asset with the line segment, and track number of the railroad track; and communicate information to the remote terminal for presenting the position of the remote terminal on the visual representation relative to the point on the railroad track nearest to the measured GPS position, along with the milepost, line segment, and track number of the railroad track.

14. The system of claim 13, wherein the at least one server is further operable to:

determine a first distance between first and second points on the railroad track;

determine a second distance between the first point on the railroad track and the GPS position;

determine from the first and second distances coordinates for the point on the track nearest to the measured GPS position; and determine the milepost for the railroad asset from mileposts for the first and second points on the track.

* * * * *